United States Patent [19]
Hara et al.

[11] Patent Number: 5,803,197
[45] Date of Patent: Sep. 8, 1998

[54] TORQUE-SPLIT CONTROL SYSTEM FOR FOUR-WHEEL-DRIVE VEHICLES

[75] Inventors: Tomoyuki Hara, Isehara; Toshiharu Takasaki, Sagamihara, both of Japan

[73] Assignee: Nissan Motor Co., Ltd., Yokohama, Japan

[21] Appl. No.: 695,380

[22] Filed: Aug. 9, 1996

[30] Foreign Application Priority Data

Aug. 11, 1995 [JP] Japan .................................. 7-206193

[51] Int. Cl.⁶ ............................................... B60K 17/348
[52] U.S. Cl. .......................... 180/248; 180/249; 701/74; 701/89
[58] Field of Search .................. 180/197, 248, 180/249; 701/89, 74, 69, 85

[56] References Cited

U.S. PATENT DOCUMENTS

| | | | |
|---|---|---|---|
| 4,866,624 | 9/1989 | Nishikawa et al. | 701/89 |
| 4,866,626 | 9/1989 | Kawamoto et al. | 701/89 |
| 4,887,689 | 12/1989 | Naito | 180/233 |
| 4,912,639 | 3/1990 | Kawamoto et al. | 180/248 |
| 5,195,037 | 3/1993 | Tezuka | 180/248 |
| 5,485,894 | 1/1996 | Watson et al. | 180/248 |

FOREIGN PATENT DOCUMENTS 1-204826  8/1988  Japan .

Primary Examiner—Daniel G. DePumpo
Attorney, Agent, or Firm—Foley & Lardner

[57] ABSTRACT

An active torque-split control system for a four-wheel-drive vehicle comprises a transfer clutch, and sensors for detecting a wheel-speed difference between a primary drive wheel and a secondary drive wheel, a throttle opening, a vehicle speed, depressed or undepressed states of a brake pedal. The system is capable of executing both a feedback control based on the wheel-speed difference and a feedforward control based on the throttle opening. The system is responsive to at least a feedback control signal from the feedback control system and an anticipating correction signal from the feedforward control system for determining a distribution ratio of driving torque of the secondary drive wheel to the primary drive wheel depending on the highest one of the feedback control signal value and the anticipating correction signal value. When accelerated from a standing start with the brake pedal depressed, the system operates to rise a secondary-drive-wheel distribution torque up to a predetermined driving-torque value regardless of the feedback control signal and the anticipating correction signal, and to decrease the driving torque, which torque is risen to the predetermined driving-torque value, at a predetermined rate of change, when the brake pedal is shifted to the undepressed state.

11 Claims, 10 Drawing Sheets

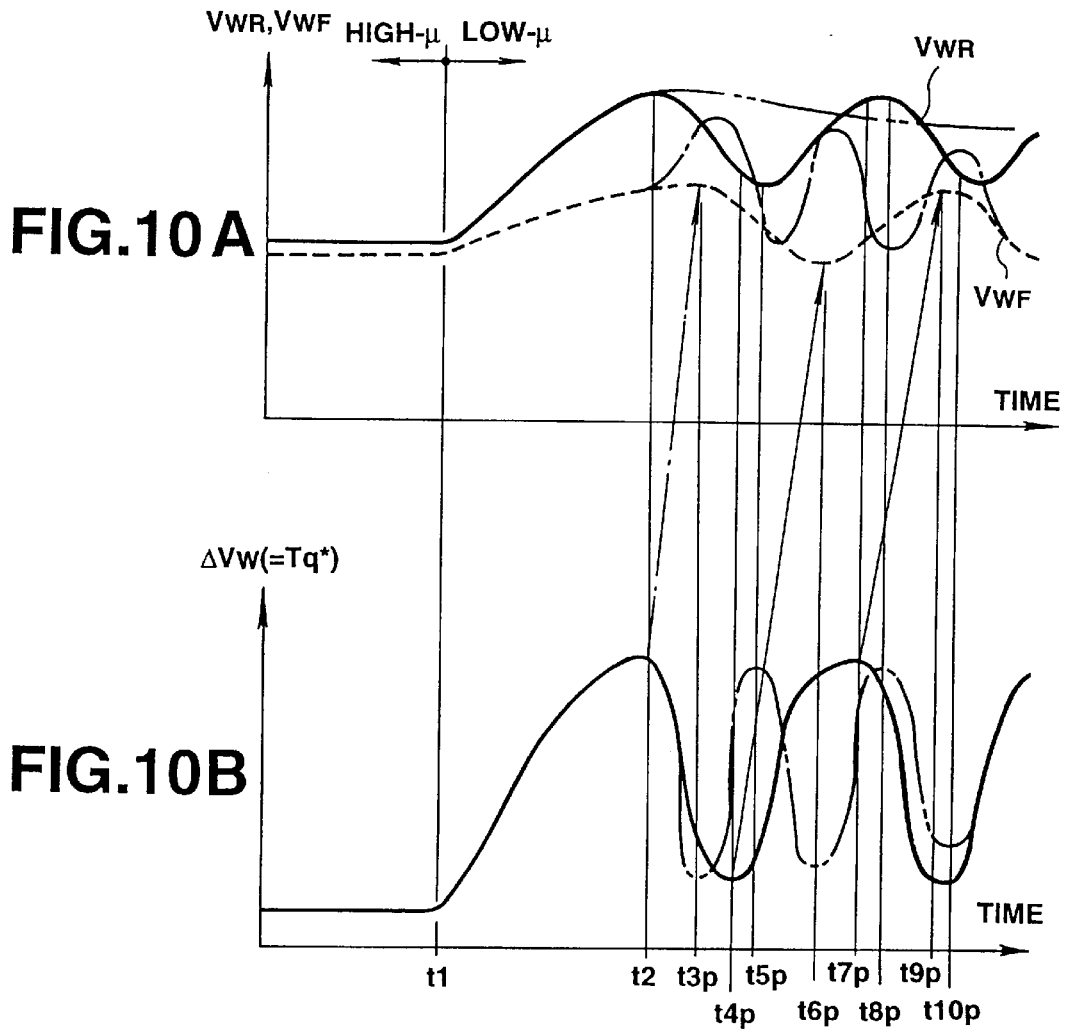

TORQUE-SPLIT CONTROL SYSTEM FOR FOUR-WHEEL-DRIVE VEHICLES

BACKGROUND OF THE INVENTION

1. Field of the Invention

The present invention relates to techniques for optimally distributing power produced by an engine into front and rear road wheels, and specifically to an active torque-split control system for use with a four-wheel-drive vehicle with a torque distributing friction-clutch, called transfer clutch, through which engine power (driving torque) is delivered to primary drive wheels of the vehicle and to secondary drive wheels at a desired torque distribution ratio which ratio is determined by adjusting a force of engagement of the transfer clutch.

2. Description of the Prior Art

In recent years, there have been proposed and developed various active torque-split control systems for use with a four-wheel-drive vehicle supported on a pair of primary drive wheels and a pair of secondary drive wheels. In conventional four-wheel-drive vehicles, either a pair of front road wheels or a pair of rear road wheels could serve as primary drive wheels, while the other could serve as secondary drive wheels. Such a conventional four-wheel-drive vehicle includes a torque distributing clutch, called transfer clutch, for variably adjusting a torque-distribution ratio of secondary drive wheels to primary drive wheels ordinarily depending on a wheel-speed difference between the primary and secondary drive wheels. During a usual straight-ahead driving, more of the engine power is transmitted via the transfer clutch to the primary drive wheels. In the event that the driving torque delivered to the primary drive wheels increases excessively undesiredly, a part of the driving torque is delivered from the primary drive wheels to the secondary drive wheels by increasingly adjusting a force of engagement of the transfer clutch. For example, the engagement force of the clutch is determined depending on a front-and-rear road wheel speed difference obtained by subtracting a mean speed of the secondary drive wheels from a mean speed of the primary drive wheels. The conventional torque split control system is so designed to variably adjust a distribution ratio of torque to be delivered to the secondary drive wheels to torque to be delivered to the primary drive wheels, for example from 0:100% towards 50%:50%, by increasingly varying the engagement force of the clutch, as the wheel-speed difference between the primary and secondary drive wheels increases. The detected wheel-speed difference is traditionally used as a control parameter necessary to determine the presence or absence of excessive torque applied to the primary drive wheels. As is generally known, there is a time delay of response with regard to the torque-distribution control, due to a response-time delay from the time of detection of the wheel-speed difference between front and rear wheels to the time when a force of engagement of the transfer clutch, serving as a controlled system, is adjusted to a desired value based on the detected wheel-speed difference. If the responsiveness of the torque-split control system is unreasonably enhanced for minimizing the response-time delay, undesired hunting may take place. Even when the responsiveness of the torque-split control system is properly enhanced while preventing hunting phenomenon, there is another response-time delay such as a first mechanical phase lag owing to a moment of inertia (rotational moment) of a secondary propeller shaft and a moment of inertia of the secondary drive wheels until the engine power is transmitted to the secondary drive wheels via the secondary propeller shaft connected to a differential associated with the secondary drive wheels via axle driveshafts, and additionally there is a further response-time delay such as a second mechanical phase lag (torque-transmission delay) until the torque is transmitted through the axle driveshafts via the tires installed at the secondary drive wheels to the road. In case of a prior art torque-split control system based on a feed-back control by way of which a wheel-speed difference is adjusted towards a desired wheel-speed difference, there is a tendency for a response-time delay to increase particularly when the vehicle starts, that is when the primary drive wheels have a greatly-increased tendency to slip or spin due to excessive driving torque delivered thereto. In case of another prior art torque-split control system based on a feed-forward control in which an amount of depression of an accelerator pedal is used as a control parameter necessary to determine whether the current running condition of the vehicle corresponds to such a particular running condition (for example during a vehicle start) that the vehicle experiences wheel-skid (often called acceleration-slip) at the primary drive wheels. According to the feed-forward control, when the vehicle begins to move, a magnitude of driving torque delivered to the secondary drive wheels becomes increased according to an increase in the detected depression amount of the accelerator pedal before a wheel spin starts to develop at the secondary drive wheels. The above mentioned feed-forward control is often called a start-period feed-forward control, since the feed-forward control is usually executed for a predetermined period from the time when the vehicle begins to move forward to the time when the detected vehicle speed exceeds a predetermined threshold value for example 20 km/h. In later models of four-wheel-drive vehicles with an active torque-split control system which can select one of at least a two-wheel-drive mode at which only primary drive wheels are driven and a so-called automatic torque-split mode at which a torque distribution between primary and secondary drive wheels is automatically controlled by varying the engagement force of the transfer clutch, a so-called stand-by pressure is used to maintain the transfer clutch at a stand-by position or at an almost engaged position, in consideration of both reduction of undesired shock resulting from rapid engaging action of the transfer clutch at the automatic torque-split mode and a high responsiveness of adjustment of the engaging force of the clutch toward a desired value. The use of the stand-by pressure has been disclosed in detail in U.S. patent application Ser. No. 320, 544 filed Oct. 11, 1994 and assigned to the assignee of the present invention, the teachings of which hereby incorporated by reference. Under such a stand-by pressure, friction discs of the transfer clutch are maintained in slightly axially spaced relationship with the respective friction plates by a predetermined slight distance, and thus the transfer clutch can be rapidly engaged with a high response, when a controlled clutch pressure above the stand-by pressure is applied to the transfer held at the stand-by position. In view of fuel-economy loss, it is unpreferable to use the stand-by pressure regardless of drive modes, namely a four-wheel-drive mode and a two-wheel-drive mode, because slight frictional contact between the friction discs and the friction plates may result in fuel-economy loss. Thus, it is desired to properly select the above-noted stand-by pressure depending on drive modes. For instance, to reduce fuel-economy loss, it is preferable to keep the transfer clutch at the fully dis-engaged position rather than the stand-by position (or the partially engaged position), in case of selection of the two-wheel-drive mode. Referring again to the previously-discussed feed-back control based on the wheel-speed difference between primary and secondary drive wheels, in addition to a comparatively great mechanical phase lag (a delay of transmission of power or driving torque from the engine to the primary drive wheels and to the secondary drive wheels) as previously described, there is a response-time delay until a wheel-speed difference is affected and varied by an actual change in torque-distribution ratio of driving torque transmitted to the primary drive wheels to driving torque transmitted to the secondary drive wheels. According to the conventional feed-back control based on the wheel-speed difference, it is difficult to prevent wheel-slip at the primary drive wheels before it happens. Also, the conventional system which executes the feed-back control, requires a time duration enough to suppress the wheel slip occurring at the primary drive wheels. To avoid this, the so-called start-period feed-forward control is advantageous, because a ratio of distribution of torque delivered to the secondary drive wheels is adjusted directly depending on the accelerator-pedal depression amount (equivalent to a throttle opening) by way of the feed-forward control. In case of the feed-forward control, for the purpose of actually delivering a part of the driving torque to be transmitted to the primary drive wheels to the secondary drive wheels, the conventional system which executes the feed-forward control requires an accelerator-pedal depression (or a throttle opening) enough to set the torque-distribution ratio at a value greater than an initial value of distribution of driving torque delivered to the secondary drive wheels which initial value is equivalent to the previously-described stand-by pressure. As may be appreciated, such a depression of the accelerator pedal, intended for the delivery of a part of driving torque from the primary drive wheels to the secondary drive wheels, necessarily permits increased engine-power to be transmitted to the primary drive wheels. Thus, there is a possibility of occurrence of wheel-slip at the primary drive wheels before a part of driving force is effectively delivered from the primary drive wheels to the secondary drive wheels through the feed-forward control, and thereafter there is a possibility of hunting particularly at the beginning of the vehicle start on an excessively low friction-factor road, often abbreviated "low-$\mu$ road", or just after the vehicle begins to move forward on an excessively low-$\mu$ road, or on a downhill road of a steep gradient (under a condition wherein the primary drive wheels are rear road wheels), or on an uphill road of a steep gradient (under a condition wherein the primary drive wheels are front road wheels). In order to solve the above-mentioned problem, the initial value equivalent to the previously-described stand-by pressure can be set at a somewhat greater value, so as to suppress the occurrence of wheel-slip at the primary drive wheels by properly delivering the driving torque to the secondary drive wheels just after the vehicle begins to move, without greatly depressing the accelerator pedal, and to eliminate hunting such as overshoot by which the system's response to an abrupt change in input exceeds a desired steady-state response and undershoot by which the system's response to an abrupt change in input falls short of the desired steady-state response. In this case, however, there is a tendency for a so-called tight-corner braking phenomenon to occur due to insufficient absorption of the rotational speed difference between front and rear road wheels, resulting from an improperly and unreasonably great magnitude of the transfer-clutch engaging force based on the initial value set at a somewhat greater value, for example when the accelerator pedal is released and then the steering-wheel is turned, i.e., when shifting to the low-speed turning with the accelerator pedal released. With a comparatively greater initial value of driving torque delivered to the secondary drive wheels, there is a greatly increased tendency for the tight-corner braking phenomenon to occur on turns at a low speed. In other words, with the initial value set at a greater value, the vehicle may exhibit strong understeer tendencies when the vehicle goes around a curve at a low speed. In contrast, even in case of a comparatively less initial value of driving torque delivered to the secondary drive wheels, there are problems of occurrence of wheel-slip at primary drive wheels when the vehicle begins to move on a low-$\mu$ road or on a steep slope, and thus undesired hunting takes place.

SUMMARY OF THE INVENTION

Accordingly, it is an object of the invention to provide an improved torque-split control system for four-wheel-drive vehicles which avoids the foregoing disadvantages of the prior art.

It is another object of the invention to provide an active torque-split control system for a four-wheel-drive vehicle which can reduce wheel-slip tendencies at primary drive wheels when the vehicle is accelerated from a standing start on a low-$\mu$ road or on a steeply sloped road of a great gradient due to which steep gradient more of the vehicle weight tends to be transferred to the secondary drive wheels, and suppress a so-called tight-corner braking phenomenon which will occur when shifting from the beginning of a straight-ahead driving of the vehicle to a vehicle turn at a low speed, and also prevent hunting of a torque-split control which hunting may occur for example owing to transition of a road surface condition from a high-$\mu$ road with great resistance to a low-$\mu$ road with less resistance.

In order to accomplish the aforementioned and other objects of the invention, a torque-split control system for a four-wheel-drive vehicle comprises a friction clutch for variably adjusting a distribution of driving torque between a primary drive wheel of front and rear road wheels and a secondary drive wheel of the front and rear road wheels by varying a force of engagement of the friction clutch, means for detecting a wheel-speed difference between the primary drive wheel and the secondary drive wheel, means for detecting a vehicle speed, means for detecting a depressed state of a brake pedal and an undepressed state of the brake pedal, and torque-split control means responsive to at least the wheel-speed difference, for determining a distribution ratio of driving torque of the secondary drive wheel to the primary drive wheel so that a driving torque to be delivered to the secondary drive wheel increases according to an increase in the wheel-speed difference, and for controlling the force of engagement of the friction clutch depending on the distribution ratio, wherein the torque-split control means determines the distribution ratio to increase the driving torque to be delivered to the secondary drive wheel by a predetermined driving-torque value, when the brake pedal is in the depressed state and the vehicle speed is essentially equivalent to zero, and wherein the torque-split control means decreases the driving torque, which torque is increased by the predetermined driving-torque value, at a predetermined rate of change, when the brake pedal is shifted from the depressed state to the undepressed state or when the vehicle speed increases from zero. The torque-split control means determines the rate of change depending on a magnitude of the driving torque to be delivered to the secondary drive wheel so that the rate of change is set at a great value when the driving torque to be delivered to the secondary drive wheel is great, and so that the rate of change is set at a less value when the driving torque to be delivered to the secondary drive wheel is less.

According to another aspect of the invention, a torque-split control system for a four-wheel-drive vehicle comprises a transfer clutch for variably adjusting a distribution of driving torque produced by an engine between a primary drive wheel of front and rear road wheels and a secondary drive wheel of the front and rear road wheels by varying a force of engagement of the transfer clutch, means for detecting a wheel-speed difference between the primary drive wheel and the secondary drive wheel, means for detecting a throttle opening of a throttle valve of the engine, means for detecting a vehicle speed, means for detecting a depressed state of a brake pedal and an undepressed state of the brake pedal, feedback control means responsive to the wheel-speed difference for generating a feedback control signal, so that a driving torque to be delivered to the secondary drive wheel increases in accordance with an increase in the wheel-speed difference, feedforward control means responsive to the throttle opening for generating an anticipating correction signal when the vehicle speed is below a predetermined threshold, so that the driving torque to be delivered to the secondary drive wheel increases in accordance with an increase in the throttle opening, and torque-split control means responsive to at least the feedback control signal and the anticipating correction signal, for determining a distribution ratio of driving torque of the secondary drive wheel to the primary drive wheel depending on the highest one of a value of the feedback control signal and a value of the anticipating correction signal, and for controlling the force of engagement of the transfer clutch depending on the distribution ratio, wherein the torque-split control means determines the distribution ratio to rise the driving torque to be delivered to the secondary drive wheel up to a predetermined driving-torque value regardless of the feedback control signal and the anticipating correction signal, when the brake pedal is in the depressed state and the vehicle speed is essentially equivalent to zero, and wherein the torque-split control means decreases the driving torque, which torque is risen to the predetermined driving-torque value, at a predetermined rate of change, when the brake pedal is shifted from the depressed state to the undepressed state or when the vehicle speed increases from zero. The torque-split control means may comprise filtering means for determining the rate of change depending on a magnitude of the driving torque to be delivered to the secondary drive wheel so that the rate of change is set at a second predetermined value when the driving torque to be delivered to the secondary drive wheel is greater than a second predetermined threshold, and so that the rate of change is set at a first predetermined value less than the second predetermined value when the driving torque to be delivered to the secondary drive wheel is less than a first predetermined threshold less than the second predetermined threshold, and so that the rate of change is linearly changed from the first predetermined value to the second predetermined value when the driving torque to be delivered to the secondary drive wheel is changed from the first predetermined threshold to the second predetermined threshold.

According to a further aspect of the invention, a torque-split control system for a four-wheel-drive vehicle comprises a transfer clutch for variably adjusting a distribution of driving torque produced by an engine between a primary drive wheel of front and rear road wheels and a secondary drive wheel of the front and rear road wheels by varying a force of engagement of the transfer clutch, means for detecting a wheel-speed difference between the primary drive wheel and the secondary drive wheel, means for detecting a throttle opening of a throttle valve of the engine, means for detecting a vehicle speed, feedback control means responsive to the wheel-speed difference for generating a feedback control signal, so that a driving torque to be delivered to the secondary drive wheel increases in accordance with an increase in the wheel-speed difference, feedforward control means responsive to the throttle opening for generating an anticipating correction signal when the vehicle speed is below a predetermined threshold, so that the driving torque to be delivered to the secondary drive wheel increases in accordance with an increase in the throttle opening, torque-split control means responsive to at least the feedback control signal and the anticipating correction signal, for determining a distribution ratio of driving torque of the secondary drive wheel to the primary drive wheel depending on the highest one of a value of the feedback control signal and a value of the anticipating correction signal, and for controlling the force of engagement of the transfer clutch depending on the distribution ratio, and the torque-split control means including filtering means for variably adjusting a rate of change of the driving torque to be delivered to the secondary drive wheel depending on a magnitude of the driving torque to be delivered to the secondary drive wheel only when a driving torque delivered to the secondary drive wheel is varying in a direction of decrease. The filtering means sets the rate of change at a predetermined maximum rate-of-change when the driving torque delivered to the secondary drive wheel is varying in a direction of increase. It is preferable that the filtering means determines the rate of change, so that the rate of change is set at a second predetermined value when the driving torque to be delivered to the secondary drive wheel is greater than a second predetermined threshold, and so that the rate of change is set at a first predetermined value less than the second predetermined value when the driving torque to be delivered to the secondary drive wheel is less than a first predetermined threshold less than the second predetermined threshold, and so that the rate of change is linearly changed from the first predetermined value to the second predetermined value when the driving torque to be delivered to the secondary drive wheel is changed from the first predetermined threshold to the second predetermined threshold.

According to a still further aspect of the invention, a torque-split control system for a four-wheel-drive vehicle, comprises a fluid-pressure operated transfer clutch for variably adjusting a distribution of driving torque produced by an engine between a primary drive wheel of front and rear road wheels and a secondary drive wheel of the front and rear road wheels by varying a force of engagement of the transfer clutch, means for detecting a wheel-speed difference between the primary drive wheel and the secondary drive wheel, means for detecting a temperature of working fluid used to vary the force of engagement of the transfer clutch, means for detecting a throttle opening of a throttle valve of the engine, means for detecting a vehicle speed, means for detecting a depressed state of a brake pedal and an undepressed state of the brake pedal, feedback control means responsive to the wheel-speed difference for generating a feedback control signal, so that a driving torque to be delivered to the secondary drive wheel increase in accordance with an increase in the wheel-speed difference, compensation means for generating a temperature-dependent compensated torque indicative signal depending on the temperature of working fluid, feedforward control means responsive to the throttle opening for generating an anticipating correction signal when the vehicle speed is below a predetermined threshold, so that the driving torque to be delivered to the secondary drive wheel increases in accordance with an increase in the throttle opening, and torque-split control means responsive to the feedback control signal, the anticipating correction signal and the temperature-dependent compensated torque indicative signal, for determining a distribution ratio of driving torque of the secondary drive wheel to the primary drive wheel depending on the highest one of a value of the feedback control signal, a value of the anticipating correction signal and a value of the temperature-dependent compensated torque indicative signal, and for controlling the force of engagement of the transfer clutch depending on the distribution ratio, wherein the torque-split control means determines the distribution ratio to rise the driving torque to be delivered to the secondary drive wheel up to a predetermined driving-torque value regardless of the feedback control signal, the anticipating correction signal and the temperature-dependent compensated torque indicative signal, when the brake pedal is in the depressed state and the vehicle speed is essentially equivalent to zero, and wherein the torque-split control means decreases the driving torque, which torque is risen to the predetermined driving-torque value, at a predetermined rate of change, when the brake pedal is shifted from the depressed state to the undepressed state or when the vehicle speed increases from zero. The torque-split control means may comprise filtering means for determining the rate of change depending on a magnitude of the driving torque to be delivered to the secondary drive wheel so that the rate of change is set at a second predetermined value when the driving torque to be delivered to the secondary drive wheel is greater than a second predetermined threshold, and so that the rate of change is set at a first predetermined value less than the second predetermined value when the driving torque to be delivered to the secondary drive wheel is less than a first predetermined threshold less than the second predetermined threshold, and so that the rate of change is linearly changed from the first predetermined value to the second predetermined value when the driving torque to be delivered to the secondary drive wheel is changed from the first predetermined threshold to the second predetermined threshold. It is desirable that the predetermined driving-torque value is preset to be greater than the second predetermined threshold. The compensation means may be designed to generate a predetermined first temperature-dependent compensated torque indicative signal when the temperature is within a normal-temperature operating region and to generate a predetermined second temperature-dependent compensated torque indicative signal when the temperature is within a low-temperature operating region. A value of the predetermined first temperature-dependent compensated torque indicative signal is preferably preset to be less than the first predetermined threshold.

BRIEF DESCRIPTION OF THE DRAWINGS

FIGS. 10A and 10B are simulation results in the form of timing charts, showing a transition state from a constant-speed driving on a high-$\mu$ road to a constant-speed driving on a low-$\mu$ road, which results are obtained through the prior art torque-split control.

DESCRIPTION OF THE PREFERRED EMBODIMENTS

Figure 1:
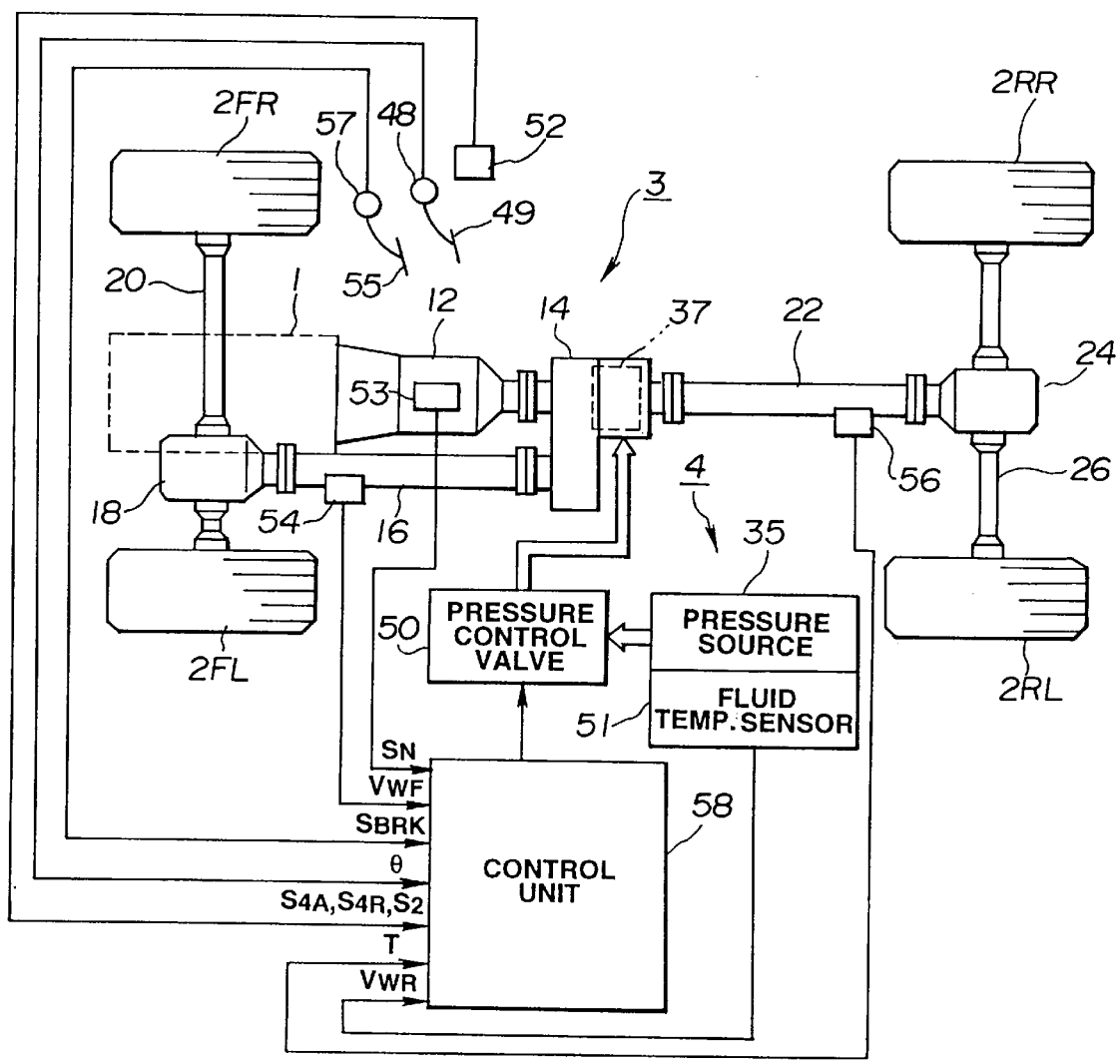
FIG. 1 is a schematic system diagram illustrating one embodiment of a torque-split control system made in accordance with the invention.
Figure 2:
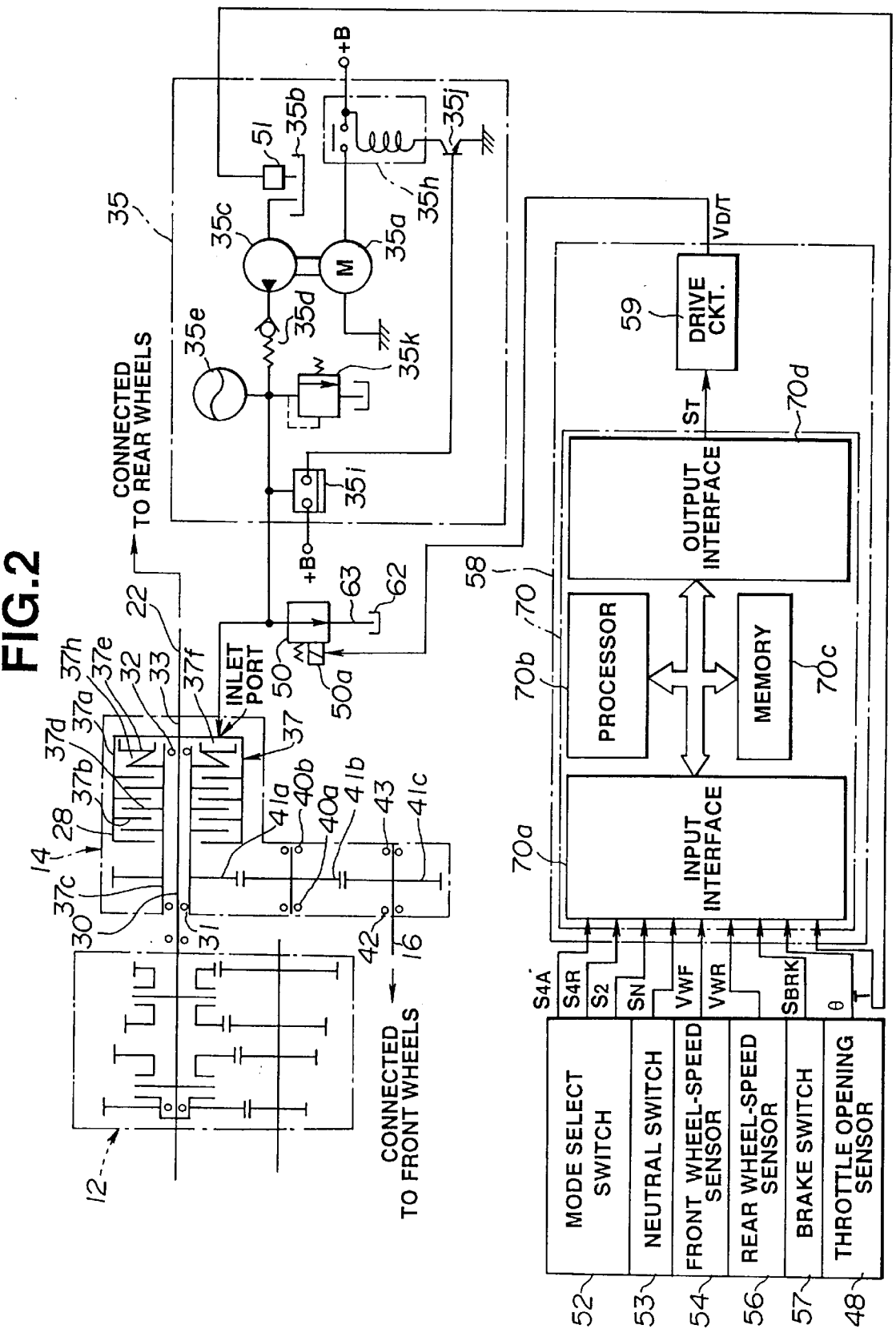
FIG. 2 is a schematic block diagram illustrating the torque-split control system of the embodiment.

Referring now to the drawings, particularly to FIGS. 1 and 2, the active torque-split control system of the invention is exemplified in case of a four-wheel-drive vehicle with a torque distributing friction-clutch, called transfer clutch, which vehicle usually operates at a front-engine, rear-drive basic mode at which power from the engine is basically delivered only to the rear drive wheels. In FIG. 1, reference sign 1 denotes an internal combustion engine serving as a prime mover. Reference signs 2FL, 2FR, 2RL and 2RR respectively denote a front-left road wheel, a front-right road wheel, a rear-left road wheel and a rear-right road wheel. Reference sign 3 represents a power train which carries the power (or the driving torque or the driving force) from the engine to the respective road wheels 2FR through 2RR. Reference sign 4 denotes a driving-torque distribution control system or a torque-split control system made according to the present invention. The power train 3 consists of a clutch (not shown) provided to connect the engine power to or disconnect it from the power train on vehicles with manual transmissions or provided to lock-up or release a rotating member employed in a planetary-gear system on vehicles with automatic transmissions, a transmission 12 provided for varying the gear ratio, and a transfer 14 provided for distributing the engine power into the front wheel side, namely front road wheels 2FL and 2FR, and into the rear wheel side, namely rear road wheels 2RL and 2RR. In the power train 3, the front-wheel side driving torque distributed by the transfer 14 is transmitted through a front propeller shaft 16, a front differential 18 and a pair of front axle driveshafts 20 to the front drive wheels 2FL and 2FR. On the other hand, the rear-wheel side driving torque distributed by the transfer 14 is transmitted to the rear drive wheels 2RL and 2RR through a rear propeller shaft 22, a rear differential 24 and a pair of rear axle driveshafts 26. As seen in FIG. 2, the transfer 14 is equipped with a transfer case 28, a transfer input shaft 30 rotatably supported in the transfer case 28 by a bearing 31 and connected to a transmission output shaft, and a transfer output shaft 33 rotatably supported in the transfer case 28 by another bearing 32 and connected to the rear propeller shaft 22 and coupled with the input shaft 30. The construction of the transfer used in the embodied system is equivalent to that of a transfer, such as being disclosed in Japanese Patent Provisional Publication No. 1-204826 or in U.S. Pat. No. 4,887,689, issued Dec. 19, 1989 to Genpei Naito, the teachings of which are hereby incorporated by reference. The transfer 14 also includes a transfer clutch 37 operatively mounted on the transfer input shaft 30 and serving as a variable driving-torque distributing clutch which functions to vary a torque-distribution ratio between front and rear drive wheels by adjusting a force of engagement of the clutch. Traditionally, a wet multiple friction-disk clutch is used as the transfer clutch 37. The clutch 37 comprises a clutch drum 37a splined to the input shaft 30 mechanically linked to the transfer case 28, a plurality of friction plates 37b integrally connected to the clutch drum 37a, a clutch hub 37c rotatably supported on the outer periphery of the input shaft 30 by means of a needle bearing or the like, a plurality of friction disks 37d integrally connected to the clutch hub 37c, a clutch piston 37e disposed in the right (viewing FIG. 2) of the transfer clutch, and a cylinder chamber 37f defined between the right-hand side wall of the clutch piston 37e and the inner wall of the clutch drum 37a. Also provided is a return spring 37h for maintaining the clutch piston 37e at its spring-loaded position where the transfer clutch is held at a fully-disengaged position. To transmit a part of the power from the engine to the front drive wheels, the transfer clutch 37 also includes a gear train consisting of three gears 41a, 41b and 41c as indicated in FIG. 2. Splined to the first gear 41a is the clutch hub 37c. The second gear 41b is rotatably supported on a pair of radial bearings 40a and 40b. The third gear 41c whose gear shaft is connected to the front propeller shaft 16 and rotatably supported on a pair of radial bearings 42 and 43. The second gear 41b meshes with both the first and third gears and thus serves as an intermediate gear provided for transmitting the torque from the first gear 41a to the third gear 41c. Although it is not clearly shown in FIG. 2, working fluid (oil) of a pressure level properly adjusted by a pressure control valve 50 (as will be discussed later) is supplied via a transfer inlet port formed at the transfer housing into the cylinder chamber 37f. With the previously-noted arrangement, the axial position of the clutch piston 37e can be adjusted depending on the pressure level of the controlled working-fluid pressure produced by the pressure control valve 50. In the absence of supply of the controlled fluid pressure from the valve 50 to the cylinder chamber 37f, i.e., when the pressure in the cylinder chamber 37f is essentially equal to atmospheric pressure, the friction plates 37b are held disengaged from the respective friction disks 37d by way of the bias of the spring 37h. Under these conditions, all of the driving torque transmitted to the transfer input shaft 30 is transferred through the transfer output shaft 33, the rear propeller shaft 22, the rear differential 24 and the rear axle driveshafts 26 to the rear drive wheels 2RL and 2RR, and thus the two-wheel-drive mode is established. In contrast to the above, in the presence of the supply of the controlled fluid pressure to the cylinder chamber 37f, produced is the transfer-clutch engaging action. That is, the clutch piston 37e is forced to axially move against the spring bias under the controlled pressure produced by the valve 50, and held at an axial position spaced apart from the spring-loaded position, and thus the friction plates 37b are brought into frictional-engagement with the respective friction disks 37d. As appreciated, the transfer-clutch engagement force or the degree of frictional-engagement depends on a pressure level of the controlled pressure produced by the valve 50. In this manner, a part of the driving torque transmitted to the transfer input shaft 30 can be delivered through the transfer drum 37a, the friction plates 37b, the friction disks 37d, the clutch hub 37c, the gear train 41a, 41b, 41c, the front propeller shaft 16, the front differential 18 and the front axle driveshafts 20 to the front drive wheels 2FL and 2FR. The transfer 14 is so designed that the torque $\Delta T_F$ transmitted to the front wheels linearly varies essentially in proportion to the controlled fluid pressure Pc produced by the valve 50. The correlative relationship between the controlled pressure Pc and the front-wheel side transmitted torque $\Delta T_F$ is represented by the following expression (1).

$$\Delta T_F = P_c \cdot S \cdot 2n\mu \cdot rm \qquad (1)$$

where S denotes a pressure receiving area of the piston 37e, n denotes the number of the friction disks 37d, $\mu$ denotes a friction factor determined by each engageable pair of the friction plate and disk, and rm denotes an effective radius of each friction disk. Accordingly, in the transfer of the embodiment, a torque-distribution ratio of front drive wheels to rear drive wheels can be continuously varied within a range of 0:100% to 50%:50%. The ratio of 0:100% means the absence of supply of the controlled fluid pressure Pc, whereas the ratio of 50%:50% means that the controlled fluid pressure Pc is a predetermined maximum pressure.

Returning again to FIG. 1, the torque-split control system 4 is comprised of the transfer 14, a fluid pressure source 35 provided for pressurizing working fluid (oil) stored in a reservoir 35b and for producing pressurized fluid, the pressure control valve 50 provided for variably adjusting a pressure level of the pressurized fluid from the pressure source 35 and for producing a controlled fluid pressure Pc to be supplied to the transfer inlet port, a front wheel speed sensor 54 detecting a front wheel speed $V_{WF}$, a rear wheel speed sensor 56 detecting a rear wheel speed $V_{WR}$, a throttle-opening sensor 48 detecting a throttle opening $\theta$ or a throttle position based on a degree of depression of the accelerator pedal 49, a mode-select switch provided for selecting one of a plurality of drive modes, for example a rear-wheel drive mode and an automatic torque-split mode, often abbreviated to an "AUTO mode", a so-called neutral switch 53 provided for determining whether the gear position selected by the selector lever is in N (neutral), a brake switch 57 provided for detecting depression of the brake pedal 55, a fluid temperature sensor 51 detecting a temperature T of working fluid in the reservoir 35b, and a control unit 58 provided for controlling a level of the controlled pressure Pc produced by the control valve 50 in response to signals $V_{WF}$, $V_{WR}$, $\theta$, T, ($S_{4A}$; $S_{4R}$; $S_2$), $S_N$, $S_{BRK}$ from the respective sensors 54, 56, 48, and 51 and switches 52, 54, 53, and 57.

Referring to FIG. 2, the fluid pressure source 35 comprises a fluid pump 35c having a driven connection with an electric motor 35a for pressurizing working fluid in the reservoir 35b and for supplying the pressurized working fluid therefrom into the transfer inlet port, a check valve 35d fluidly connected to the discharge port of the pump 35c, a pressure accumulator 35e fluidly disposed in a connection line between the transfer inlet port and the check valve 35d, and a relief valve 35k fluidly connected to the connection line at the same connection point as the accumulator 35e.

Figure 3:
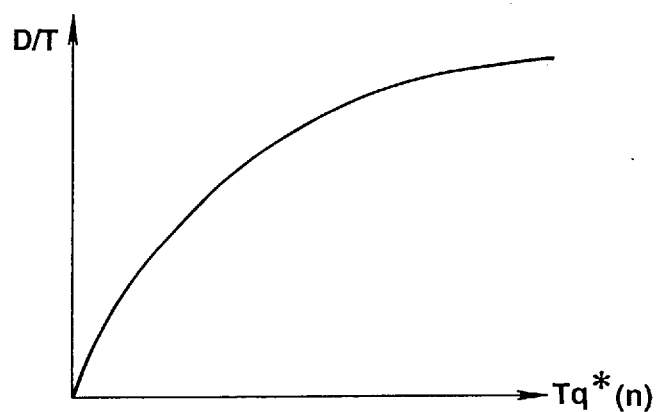
FIG. 3 is a look-up table showing a target front-wheel distribution torque (Tq*(n)) versus duty-ratio (D/T) characteristic curve.

The pressure control valve 50 is fluidly connected to the connection line and upstream of the accumulator 35e. As seen in FIG. 1, the pressure control valve 50 consists of a duty-ratio controlled normally-open type pressure-reducing valve as will be hereinafter discussed later. The control valve 50 is equipped with an electromagnetic solenoid 50a, a drain port 63 connected to a reservoir 62, and a return spring (not numbered) for biasing the position of the control valve to its normally-open position. One motor-winding end of the motor 35a is electrically connected through a motor relay 35h to the battery positive terminal +B, while the other motor-winding end is grounded. The exciting coil of the relay 35h is connected to the collector of a transistor 35j. The emitter of the transistor 35j is grounded, the base of the transistor is connected through a resistor R1 (not shown) to one terminal of a pressure switch 35i. The other terminal of the pressure switch 35i is connected to the battery positive terminal +B. The pressure switch 35i is fluidly connected to the connection line between the transfer inlet port and the pressure control valve 50, for regulating or maintaining the line pressure in the connection line at a predetermined pressure level. For instance, when the line pressure exceeds the predetermined pressure level, the pressure switch 35i is switched OFF, and thus the transistor 35j is turned OFF, thereby opening the contacts of the relay 35h. With the relay contacts opened, the motor 35a is deactivated. Additionally, the excessive fluid pressure above the predetermined pressure level can be relieved by way of the relief valve 35k. In contrast to the above, when the previously-noted line pressure is less than the predetermined pressure level, the pressure switch 35i is switched ON and thus the transistor 35j is turned ON, with the result that the contacts of the relay 35h are closed. As a result, the motor 35a is energized and then the pump 35c is driven so as to produce an increased line pressure. In this manner, the pressure switch 35i and the motor relay 35h are cooperative with each other to keep the line pressure at the predetermined pressure level, and whereby the fluid pressure source can stably provide the line pressure regulated at a predetermined pressure level as a primary pressure of the pressure control valve 50. In a conventional manner, the pressure control valve 50, which is ordinarily comprised of a duty-ratio controlled normally-open type pressure-reducing valve, is operated by way of a pulse-width-modulation control, often abbreviated to "PWM control". Therefore, the opening of a spool accommodated in the pressure control valve 50 is determined depending on a command voltage signal $V_{D/T}$ having a given duty ratio D/T and generated from the drive circuit 59 of the control unit 58. The duty-ratio controlled pressure-reducing valve 50 is designed such that a controlled fluid pressure Pc regulated by the pressure reducing valve 50 and supplied to the transfer inlet port increases as the duty ratio D/T increases. In the exemplified power train, the clutch engagement force of the transfer is essentially proportional to the controlled fluid pressure Pc, while the clutch engagement force is essentially proportional to the driving torque distributed to the front wheels. In actual, as seen in FIG. 3, the front-wheel distribution torque Tq, for example ranging from 0 to 115 kgm, which torque is obtained through the PWM control, tends to be quadratically increased in accordance with an increase in the duty ratio D/T. The front-wheel speed sensor 54 and the rear-wheel speed sensor 56 are provided independently of each other respectively at the front and rear propeller shafts 16 and 22, for optically (or electromagnetically) detecting revolution speeds of the propeller shafts 16 and 22, and for generating pulse signals (or sinusoidal-wave signals) representative of a front-wheel speed $V_{WF}$ and $V_{WR}$ equivalent to the detected revolution speeds. The mode select switch 52 is usually installed on the instrument panel in the vicinity of the driver seat, for generating a selected mode signal depending on the angular position thereof. Usually provided are three angular positions, namely a first angular position being equivalent to a two-wheel drive mode (or rear-wheel drive mode), often abbreviated to "2WD mode" at which the engine power is delivered only to the rear wheels serving as the primary drive wheels, a second angular position being equivalent to a so-called rigid four-wheel drive mode, often abbreviated to "LOCK mode" at which half the power is delivered to the primary drive wheels (rear wheels) whereas the remaining half is delivered to the secondary drive wheels (front wheels), and a third angular position being equivalent to an automatic torque-split mode, often abbreviated to "AUTO mode" at which a torque-distribution ratio between front and rear wheels is adjusted over a distribution ratio of 0:100% through 50%:50% automatically depending on the running conditions of the vehicle or the operating conditions of the driver for example the depressing action of the brake pedal, the amount of depression of the accelerator pedal, the road surface condition or the like. When the mode selection switch 52 is positioned at the first angular position, the switch 52 outputs a 2WD mode selection signal $S_2$ of a logical value "1", and simultaneously a LOCK mode selection signal $S_{4R}$ and an AUTO mode selection signal $S_{4A}$ are both set at logical values "0". When the second angular position is selected by the vehicle occupant, the switch 52 outputs the LOCK mode selection signal $S_{4R}$ of a logical value "1" and simultaneously the two signals $S_2$ and $S_{4A}$ are both set at logical values "0". Similarly, when the third angular position is selected, the switch 52 outputs the AUTO mode selection signal $S_{4A}$ of a logical value "1" and simultaneously the two signals $S_2$ and $S_{4R}$ are both set at logical values "0". The neutral switch 53 outputs a neutral position indicative signal $S_N$ corresponding to a logical value "1", when the gear position is N (neutral). In case that the gear position is kept at any positions except the neutral position, the neutral switch is turned OFF to generate a signal $S_N$ of a logical value "0". The throttle-opening sensor 48 is generally comprised of a throttle position sensor installed on the throttle assembly of the engine for sensing the angular position of the throttle valve and for outputting an analog voltage signal representative of the throttle opening, because the angular position of the throttle valve is essentially correlated to the amount of depression of the accelerator pedal. For instance, when the amount of depression of the accelerator pedal 49 is zero, the throttle-opening sensor outputs a voltage signal representative of a throttle opening θ of "0%". When the amount of depression of the accelerator pedal reaches the maximum value, that is, in case of a so-called full throttle, the throttle-opening sensor 48 outputs a voltage signal representative of a throttle opening θ of "100%". The throttle-opening sensor 48 can generate a throttle-opening indicative voltage signal value, ranging from 0% (closed throttle) to 100% (full throttle), depending on the amount of depression of the accelerator pedal 49. As is generally known, the throttle position sensor has a throttle opening versus throttle-opening indicative voltage signal value characteristic that the throttle-opening indicative voltage signal value increases in proportion to the throttle opening. Also, a standard switch used to light the brake lamp is often applied in common to the brake switch 57. The brake switch 57 generates a brake signal $S_{BRK}$ of a logical value "1", indicative of the depressed state of the brake pedal when the brake pedal 55 is depressed, and generates the brake signal S_BRK of a logical value "0", indicative of the undepressed state of the brake pedal when the brake pedal is undepressed. The control unit 58 comprises a microcomputer 70 and the drive circuit 59. The output terminal of the drive circuit 59 is connected to the solenoid 50$a$ of the pressure control valve 50 for outputting the voltage signal V_D/T oscillating at a given duty cycle (or a duty ratio D/T) to the solenoid and for opening and closing at the given duty cycle, and consequently the pressure control valve can generate the controlled fluid pressure Pc based on the given duty ratio D/T from the pressure control valve 50 to the transfer inlet port. The microcomputer 70 consists of an input interface 70$a$ connected to the output terminals of the switches and sensors 52, 53, 54, 56, 57, 48 and 51 for receiving various sensor signals (S_4A, S_4R, S_2), S_N, V_WF, V_WR, S_BRK, θ and T and serving as an analog-to-digital converter, a processor 70$b$, a memory 70$c$ including read only memories (ROM) and random access memories (RAM), and an output interface 70$d$ serving as a digital-to-analog converter for outputting a clutch-engagement-force indicative control signal S_T, which is obtained through the processor 70$b$, to the input terminal of the drive circuit 59. Briefly speaking, the microcomputer 70 employed in the control unit 58 executes the routine shown in FIG. 4, so as to derive the wheel-speed difference ΔVw between the rear and front wheel speeds V_WR and V_WF, and to derive or retrieve a first front-wheel distribution torque Tq_1 from the wheel speed difference ΔVw, and to retrieve a second front-wheel distribution torque Tq_2 from the fluid temperature (oil temperature) T detected, to retrieve a third front-wheel distribution torque Tq_3 from the throttle opening θ detected, and to determine a fourth front-wheel distribution torque Tq_4 based on the brake signal S_BRK, and to set a reference front-wheel distribution torque Tq_0 depending on the highest one of the first, second, third and fourth front-wheel distribution torques Tq_1, Tq_2, Tq_3, and Tq_4, and on signal values of the mode selection signals S_4A, S_4R and S_2 from the mode selection switch 52. In case that the reference front-wheel distribution torque Tq_0 is less than or equal to a previous value Tq*(n−1) of the target front-wheel distribution torque, the rate-of-change Tq' of the front-wheel distribution torque is variably adjusted depending on the previous value Tq*(n−1) of the target front-wheel distribution torque. Exactly, the rate-of-change Tq' of the front-wheel distribution torque means a rate-of-change dTq/dt of the front-wheel distribution torque with respect to t (time). In case that the reference front-wheel distribution torque Tq_0 is greater than the previous value Tq*(n−1) of the target front-wheel distribution torque, the rate-of-change Tq' of the front-wheel distribution torque is a predetermined maximum rate-of-change Tq'_MAX. The current value Tq*(n) of the target front-wheel distribution torque is determined on the basis of the integrated value (∫Tq'·dt) of the rate-of-change Tq' of the front-wheel distribution torque, so that the integrated value (∫Tq'·dt) does not overshoot the reference front-wheel distribution torque Tq_0. Finally, the control signal S_T, which is obtained from the determined current value Tq*(n) of the target front-wheel distribution torque through the digital-to-analog conversion, is output from the output interface 70$d$ to the drive circuit 59. In response to the control signal S_T from the output interface 70$d$, the drive circuit 59 generates a command voltage signal or a drive signal V_D/T of a given duty ratio D/T which is determined by the characteristic curve shown in FIG. 3, and whereby the torque delivered to the front wheels can be adjusted towards the determined current value Tq*(n) of the target front-wheel distribution torque. The duty ratio T/D corresponds to a ratio of ON-OFF time periods of the drive signal V_T/D from the drive circuit 59. As is generally known, since the ON-OFF time periods of the drive signal V_T/D (in the form of the pulse signal) are determined by a pulse length from the leading edge of the pulse waveform to the trailing edge and by a pulse length from the trailing edge to the leading edge, the drive circuit 59 usually includes a so-called PWM drive circuit which includes a reference pulse-wave generator, a comparator and the like. The operation of the microcomputer 70 employed in the control unit 58 will be hereinafter described in detail in accordance with the flow chart shown in FIG. 4.

Figure 4:
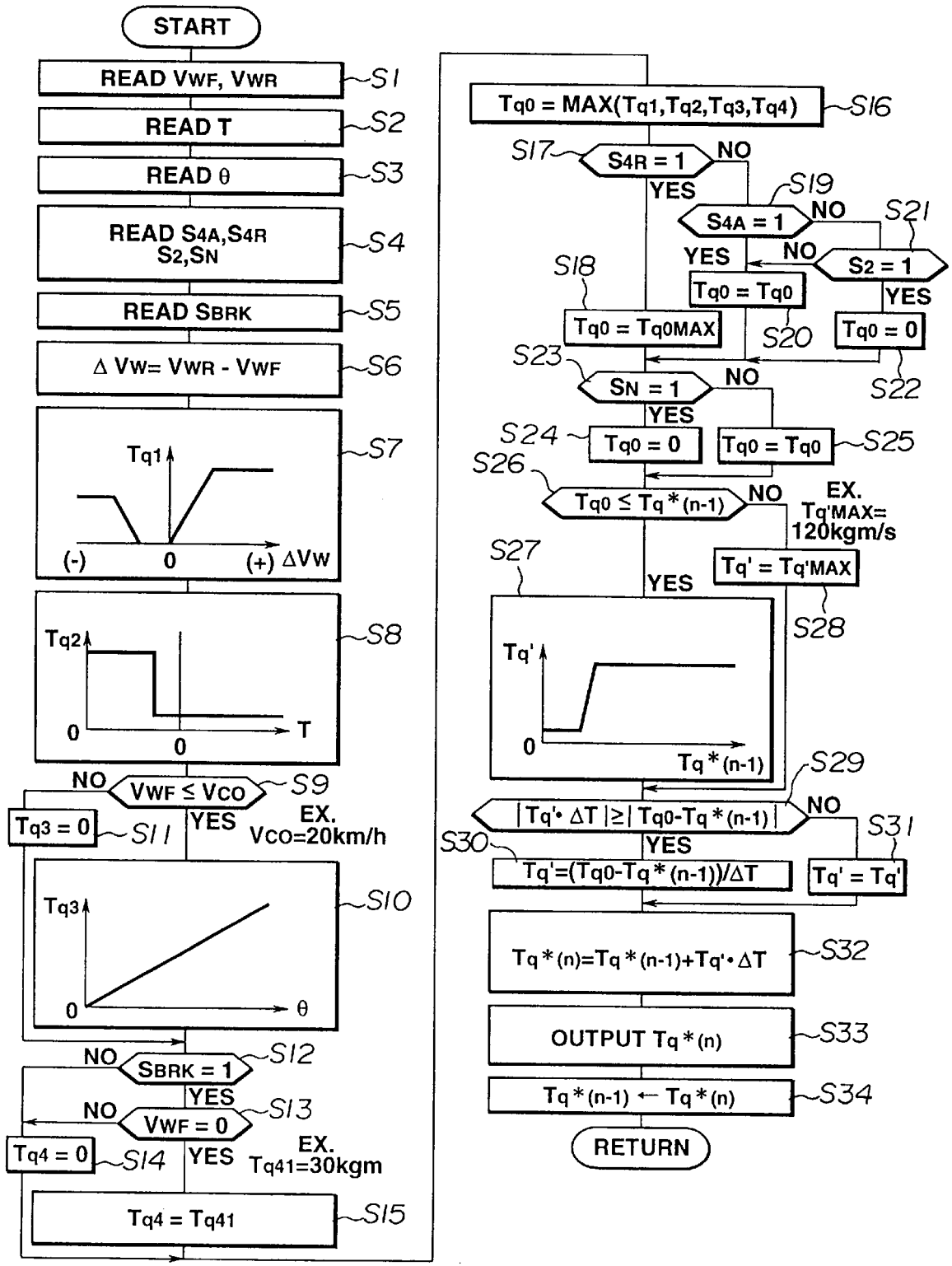
FIG. 4 is a flow chart illustrating the programming executed by the control unit employed in the system of the embodiment.

The routine executed by the control unit 58 is executed as time-triggered interrupt routines to be triggered every predetermined sampling time intervals ΔT such as 10 msec. The data (for example, see steps S7, S8, S10, and S27) necessary for the arithmetic operation of FIG. 4 are stored in the form of data map in the ROM constructing the memory 70$c$ of the microcomputer. The program of FIG. 4 is also prestored in the ROM of the memory 70$c$. Data (for example the wheel-speed difference ΔVw, the first, second, third, and fourth front-wheel distribution torques Tq_1, Tq_2, Tq_3, Tq_4, the reference front-wheel distribution torque Tq_0, the rate-of-change Tq' of the front-wheel distribution torque, the previous value Tq*(n−1) of the target front-wheel distribution torque, the current value Tq*(n) of the target front-wheel distribution torque) calculated through the arithmetic operation of FIG. 4 are temporarily stored in the RAM of the memory 70$c$.

In step S1, read are the front-wheel speed V_WF from the sensor 54 and the rear-wheel speed V_WR from the sensor 56. In step S2, read is the working-fluid temperature T from the sensor 51. In step S3, read is the throttle opening θ from the sensor 48. In step S4, read are the mode selection signals S_4A, S_4R, S_2 from the mode selection switch 52 and the neutral position indicative signal S_N from the neutral switch 53. In step S5, read is the brake signal S_BRK from the brake switch 57. In step S6, the wheel-speed difference ΔVw between the rear wheel speed V_WR and the front wheel speed V_WF is calculated in accordance with the following expression (2).

$$\Delta Vw = V_{WR} - V_{WF} \qquad (2)$$

Figure 5:
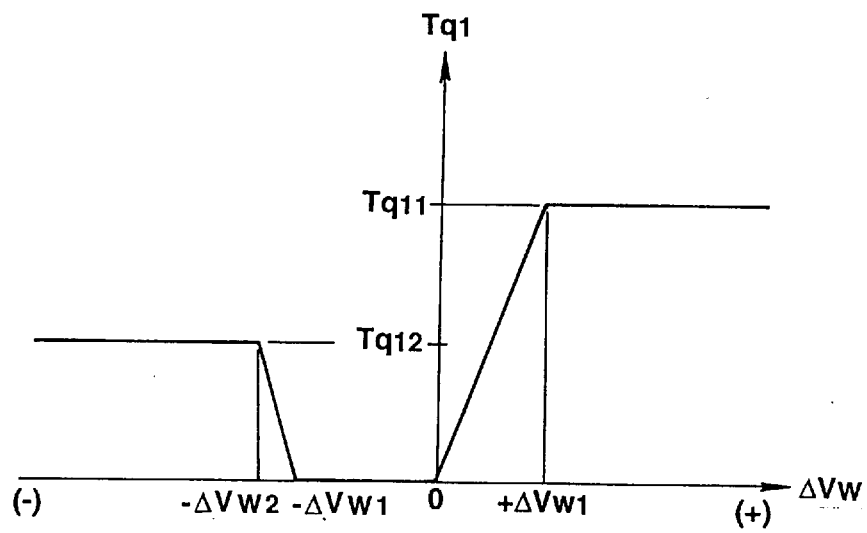
FIG. 5 is a data map illustrating the relationship between a front-and-rear wheel-speed difference ($\Delta Vw$) and a first front-wheel distribution torque (Tq1).

In step S7, the first front-wheel distribution torque Tq_1 is retrieved from the calculated wheel-speed difference ΔVw by reference to the look-up table or the data map clearly shown in FIG. 5. As appreciated from the relationship between the wheel-speed difference ΔVw and the first front-wheel distribution torque Tq_1, when the calculated wheel-speed difference ΔVw exceeds a predetermined positive threshold +ΔVw_1, the previously-noted first torque Tq_1 is kept at a predetermined great value Tq_11 such as 115 kgm which corresponds to a predetermined maximum front-wheel distribution torque at which the torque-distribution ratio is equal to 50%:50%. When the calculated wheel-speed difference ΔVw is within a range of 0 to +ΔVw_1, the first torque Tq_1 increases in a linear fashion in accordance with the increase in the calculated wheel-speed difference ΔVw. When the calculated wheel-speed difference ΔVw is within a predetermined dead zone (dead band) defined between 0 and a predetermined first negative threshold −ΔVw_1, the first torque Tq_1 is kept at 0. When the calculated wheel-speed difference ΔVw is less than a predetermined second negative threshold −ΔVw_2, the first torque Tq_1 is kept at a predetermined small value Tq_12 such as 50 kgm. Within a zone ranging from the predetermined first negative threshold=ΔVw_1 to the predetermined second negative threshold $-\Delta V_{W2}$, the first torque $T_{q1}$ increases linearly in accordance with the decrease in the calculated wheel-speed difference $\Delta V_W$.

Figure 6:
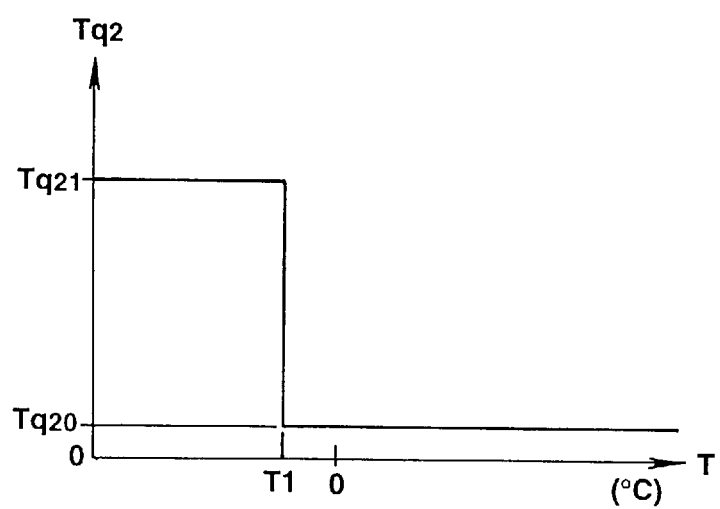
FIG. 6 is a data map illustrating the relationship between a working-fluid temperature (T) and a second front-wheel distribution torque (Tq2).

In step S8, the second front-wheel distribution torque $T_{q2}$ is retrieved from the fluid temperature (oil temperature) T read in step S2 by reference to the look-up table shown in FIG. 6. As appreciated from the map shown in FIG. 6, when the detected fluid temperature T exceeds a predetermined threshold $T_1$ (or a predetermined low temperature such as $-10°$ C.) less than 0° C., that is in case that the working-fluid temperature T is within a usual- or normal-temperature operating region, the second front-wheel distribution torque $T_{q2}$ is kept at a predetermined excessively small value $T_{q20}$, for example ranging from 2 kgm to 4 kgm. When the detected fluid temperature T is below the predetermined low temperature $T_1$ ($-10°$ C.), i.e., in case that the fluid temperature T is within a low-temperature operating region, the second front-wheel distribution torque $T_{q2}$ is kept at a predetermined great value $T_{q21}$ such as 60 kgm or more.

Figure 7:
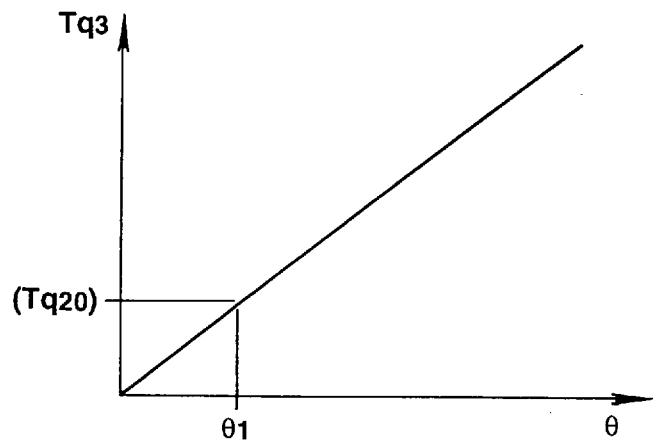
FIG. 7 is a data map illustrating the relationship between a throttle opening ($\theta$) and a third front-wheel distribution torque (Tq3).

In step S9, a test is made to determine whether the front-wheel speed (or the secondary drive wheel speed) $V_{WF}$ (read in step S1 and regarded as a speed substantially equivalent to the vehicle speed) is less than or equal to a predetermined vehicle speed $V_{CO}$ such as 20 km/h. In case of $V_{WF}<V_{CO}$, step S10 enters. In case of $V_{WF}>V_{CO}$, step S11 proceeds. In step S10, the third front-wheel distribution torque $T_{q3}$ is retrieved from the throttle opening θ read in step S3 by reference to the look-up table shown in FIG. 7, and then step S12 proceeds. As may be appreciated from the map shown in FIG. 7, the third front-wheel distribution torque $T_{q3}$ is set to increase linearly in direct-proportion to the throttle opening θ. In FIG. 7, a predetermined value $T_{q20}$ corresponds to a predetermined throttle opening θ1 slightly greater than a throttle opening obtained just after depression of the accelerator pedal. Note that the predetermined value $T_{q20}$ indicated in FIG. 7 is equal to the previously-noted predetermined excessively small value $T_{q20}$ indicated in FIG. 6. Therefore, the third front-wheel distribution torque $T_{q3}$ is preset to be greater than the predetermined small value $T_{q20}$ at the throttle opening above the predetermined throttle opening θ1. In step S11, the third front-wheel distribution torque $T_{q3}$ is set at "0", and then step S12 enters in which a test is made to determine whether the brake signal $S_{BRK}$ read in step S5 is a logical value "1". When the answer to step S12 is affirmative (YES), step S13 proceeds. When the answer to step S12 is negative (NO), step S14 proceeds. In step S13, a test is made to determine whether or not the front-wheel speed $V_{WF}$ is zero, that is, the vehicle is in a stopped state. When the front-wheel speed $V_{WF}$ is equal to zero, step S15 proceeds. When the front-wheel speed $V_{WF}$ is not equal to zero, step S14 proceeds. In step S15, the fourth front-wheel distribution torque $T_{q4}$ is set at a predetermined value $T_{q41}$ (for example 30 kgm) greater than the predetermined excessively small value $T_{q20}$ (see FIG. 6). Then, step S16 enters. In step S14, the fourth front-wheel distribution torque $T_{q4}$ is set at "0" and then step S16 proceeds.

In step S16, selected is the highest one of the first, second, third and fourth front-wheel distribution torques $T_{q1}$ (see step S7), $T_{q2}$ (see step S8), $T_{q3}$ (see step S11) and $T_{q4}$ (see step S15). Also, as indicated by the following equation (3), the selected torque MAX ($T_{q1}$, $T_{q2}$, $T_{q3}$, $T_{q4}$) is set as a reference front-wheel distribution torque $T_{q0}$. The selected torque MAX ($T_{q1}$, $T_{q2}$, $T_{q3}$, $T_{q4}$) will be hereinafter referred to as a "select-HIGH torque".

$$T_{q0}=\text{MAX}(T_{q1}, T_{q2}, T_{q3}, T_{q4}) \quad (3)$$

In step S17, a test is made to determine whether the LOCK mode selection signal or the rigid four-wheel-drive mode selection signal $S_{4R}$ is a logical value "1". When the answer to step S17 is affirmative, step S18 proceeds. When the answer to step S17 is negative, step S19 proceeds. In step S19, a test is made to determine whether the AUTO mode selection signal or the automatic torque-split mode selection signal $S_{4A}$ is a logical value "1". When the answer to step S19 is affirmative, step S20 proceeds. When the answer to step S19 is negative, step S21 proceeds. In step S21, a test is made to determine whether the 2WD mode selection signal or the two-wheel-drive mode selection signal $S_2$ is a logical value "1". When the answer to step S21 is affirmative, step S22 enters. When the answer to step S21 is negative, the procedure flows to step S20. In step S18, the reference front-wheel distribution torque $T_{q0}$ is set at a predetermined maximum value $T_{q0MAX}$ of the front-wheel distribution torque, and then step S23 proceeds. In step S20, the select-HIGH torque MAX($T_{q1}$, $T_{q2}$, $T_{q3}$, $T_{q4}$) temporarily set at the reference front-wheel distribution torque $T_{q0}$ through step S16 is selected again as a reference front-wheel distribution torque $T_{q0}$. Then step S23 proceeds. In step S22, the reference front-wheel distribution torque $T_{q0}$ is set at "0", and then step S23 proceeds. In step S23, a test is made to determine whether the neutral position indicative signal $S_N$ is a logical value "1". When the signal value $S_N$ is "1", step S24 proceeds. When the signal value $S_N$ is "0", step S25 proceeds. In step S24, the reference front-wheel distribution torque $T_{q0}$ is set at "0", and then step S26 proceeds. In step S25, the reference front-wheel distribution torque $T_{q0}$ obtained through step S22 remains unchanged, and then step S26 proceeds. In step S26, a test is made to determine whether the reference front-wheel distribution torque $T_{q0}$ set through steps S24 or S25 is less than or equal to the previous value $T_{q}^*(n-1)$ of the target front-wheel distribution torque. In case of $T_{q0}<T_{q}^*(n-1)$, step S27 proceeds. In case of $T_{q0}>T_{q}^*(n-1)$, step S28 proceeds. In step S27, the rate-of-change $T_{q}'$ of the front-wheel distribution torque is retrieved from the previous value $T_{q}^*(n-1)$ of the target front-wheel distribution torque which previous value may be delivered to the front wheels currently, by reference to the data map shown in FIG. 8. Thereafter, step S29 proceeds. As appreciated from the map shown in FIG. 8, in case that the previous front-wheel distribution torque $T_{q}^*(n-1)$ is within a range of 0 to $T_{q}^*_1$ (a first predetermined threshold such as 20 kgm), the rate-of-change $T_{q}'$ of the front-wheel distribution torque is kept at a first predetermined value $T_{q}'_1$ such as $-15$ kgm/s. In case that the previous value $T_{q}^*(n-1)$ exceeds a second predetermined threshold $T_{q}^*_2$ (for example 25 kgm) greater than the first predetermined threshold $T_{q}^*_1$, the rate-of-change $T_{q}'$ is kept at a second predetermined value $T_{q}'_2$ such as $-120$ kgm/s. The second predetermined value $T_{q}'_2$ corresponds to the minimum rate-of-change ($-T_{q}'_{MAX}$) of the front-wheel distribution torque. In case that the previous value $T_{q}^*(n-1)$ is greater than the first predetermined threshold $T_{q}^*_1$ and less than the second predetermined threshold $T_{q}^*_2$, the rate-of-change $T_{q}'$ is set to increase linearly in proportion to the previous value $T_{q}^*(n-1)$. In the shown embodiment, used as the second predetermined threshold $T_{q}^*_2$ is the maximum value of the front-wheel distribution torque which maximum torque value will occur during normal driving on low-$\mu$ roads except during vehicle start on low-$\mu$ roads, during quick turn, during transition from a high-$\mu$ road to a low-$\mu$ road. The transition from a high-$\mu$ road to a low-$\mu$ road will be hereinbelow referred to as a "$\mu$-jump".

In step S28, the rate-of-change $T_{q}'$ of the front-wheel distribution torque is set at the predetermined maximum rate-of-change $T_{q}'_{MAX}$ (for example 120 kgm/s) of the front-wheel distribution torque, and thereafter the procedure flows to step S29. In step S29, a test is made to determine whether the absolute value |Tq'·ΔT| of the product (Tq'·ΔT) of the rate-of-change Tq' obtained through steps S27 or S28 and the predetermined sampling time interval ΔT is greater than or equal to the absolute value |Tq0−Tq*(n−1)| of the difference (Tq0−Tq*(n−1)) between the reference front-wheel distribution torque Tq0 obtained through steps S24 or S25 and the previous value Tq*(n−1) of the target front-wheel distribution torque. In case of |Tq'·ΔT|≧|Tq0−Tq*(n−1)|, step S30 proceeds. In case of |Tq'·ΔT|<|Tq0−Tq*(n−1)|, step S31 proceeds. In step S30, the rate-of-change Tq' of the front-wheel distribution torque is calculated in accordance with the following expression (4).

$$Tq'=(Tq_0-Tq^*(n-1))/\Delta T \quad (4)$$

In step S31, the rate-of-change Tq' of the front-wheel distribution torque stored in the predetermined memory address of the memory 70c is updated by the rate-of-change Tq' obtained through steps S27 or S28, and thereafter step S32 proceeds.

In step S32, the current value Tq*(n) of the target front-wheel distribution torque is calculated as a function of the rate-of-change Tq' of the front-wheel distribution torque in accordance with the following expression (5)

$$Tq^*(n)=Tq^*(n-1)+Tq'\cdot\Delta T \quad (5)$$

Thereafter, the procedure flows to step S33 in which the control signal ST corresponding to the current value Tq*(n) of the target front-wheel distribution torque is output to the drive circuit 59. In step S34, the previous value Tq*(n−1) of the target front-wheel distribution torque is updated by the current value Tq*(n), and thereafter the main program is returned again.

In more detail, the torque-split control system for four-wheel-drive vehicles operates as follows.

First of all, when there is the wheel speed difference ΔVw (=VwR−VwF), in step S7 the first front-wheel distribution torque Tq1 is determined on the basis of the wheel speed difference ΔVw. The positive wheel speed difference ΔVw means that the primary drive wheels (the rear wheels 2RL and 2RR) experience a so-called acceleration slip, i.e., the rear-wheel speed VwR exceeds the vehicle speed for example due to lowering of the friction factor of the road surface or due to hard acceleration. In such a case, the driving-torque distribution for the front wheels must be increased to enhance a running stability or a drivability, or to ensure a proper steer characteristic. For example, in the case that the calculated wheel speed difference ΔVw gradually increases from zero towards the predetermined positive threshold +ΔVw1, as seen in FIG. 5 the first front-wheel distribution torque Tq1 is rapidly increased in accordance with the increase in the wheel speed difference ΔVw. If the calculated wheel speed difference ΔVw exceeds the predetermined positive threshold +ΔVw1, the first front-wheel distribution torque Tq1 is fixed at the predetermined maximum front-wheel distribution torque Tq11 such as 115 kgm, with the result that the driving-torque distribution ratio between front and rear wheels is kept at 50%:50%, i.e., the vehicle can travel at a mode essentially equivalent to the rigid four-wheel-drive mode, and thus the running stability can be enhanced. On the other hand, the negative wheel speed difference ΔVw means that the primary drive wheels 2RL and 2RR tend to lock due to excessive engine braking force or excessive wheel-cylinder braking force during braking (vehicle deceleration) on low-μ roads, i.e., the rear-wheel speed VwR is less than the vehicle speed, or that the vehicle rounds a curve on high-μ roads and for example the right-angle turn is made on a radius less than a predetermined turning radius and due to difference in wheel travel a mean rotational speed of a faster-turning front-outer wheel and a slower-turning front-inner wheel exceeds a mean rotational speed of a faster-turning rear-outer wheel and a slower-turning rear-inner wheel. As previously discussed, the negative wheel speed difference ΔVw takes place due to excessive braking on low-μ roads or due to right-angle or left-angle turn on high-μ roads. As the negative wheel-speed difference ΔVw decreases far away from zero, the driving-torque distribution for the front wheels must be increased to enhance a running stability or to ensure a proper steer characteristic (neutral steer or weak understeer). However, the wheel-lock tendency (or a so-called deceleration-slip tendency) at the rear wheels may be increased in the event that the driving-torque distribution for the front wheels is improperly increased and as a consequence the driving torque for the rear wheels is reduced unintendedly when the rear wheels have a greatly-reduced tendency to be locked. On turns at a low speed, the negative wheel-speed difference ΔVw may be a relatively small value close to zero. During such a low-speed turn, in the event that the engagement force of the transfer clutch improperly increases for the purpose of increase in the driving-torque distribution for the front wheels, the vehicle may experience a so-called tight-corner braking phenomenon. For the reasons set out above, provided in the map shown in FIG. 5 is the dead band defined by −ΔVw1≦ΔVw<0 within which the first front-wheel distribution torque Tq1 is set at "0" so as to prevent wheel-lock tendencies at the rear wheels or to avoid the undesired tight-corner braking phenomenon. In case of −ΔVw2≦ΔVw<−ΔVw1, the first front-wheel distribution torque Tq1 is increased in accordance with the decrease in the calculated wheel-speed difference ΔVw. In case of the wheel-speed difference ΔVw less than the predetermined second negative threshold −ΔVw2, the first front-wheel distribution torque Tq1 is kept at the predetermined value Tq12 such as 50 kgm which corresponds to substantially ¼ as large as the driving force delivered to the rear wheels, and whereby the running stability of the vehicle can be enhanced.

Secondly, the second front-wheel distribution torque Tq2 is determined on the basis of the detected fluid temperature T read in step S2 by reference to the data map shown in FIG. 6. As is generally known, oil is used as working fluid for the fluid-pressure operated transfer clutch. The coefficient of viscosity or flow resistance of working fluid (oil) tends to increase under a low-temperature operating environment below freezing point. For example, in the cold region, the dynamic characteristic of the fluid pressure control system, which system includes the fluid pressure source 35 and the pressure control valve 50, varies due to an increased viscosity coefficient of the working fluid. In other words, in the snowy and cold area, there is a possibility that the transfer clutch does not operate normally in response to the calculated duty ratio D/T and thus the driving torque to be delivered to the front wheels is not adjusted towards the current value Tq*(n) of the target front-wheel distribution torque. Under a low-temperature operating environment below the freezing point greatly less than 0° C., the road surface tends to freeze easily and also there is a high possibility of a snowfall. For the reasons set forth above, as seen in FIG. 6, within a temperature range lower than the predetermined threshold T1 such as −10° C., the second front-wheel distribution torque Tq2 is set at the predetermined great value $Tq_{21}$ such as 20 kgm or more, so as to prevent malfunction of the fluid-pressure control system including the pressure control valve 50 and the fluid pressure source 35 and to enhance the running stability by distributing the engine power into the four wheels. The working-fluid temperature (T) versus second front-wheel distribution torque ($Tq_2$) characteristic shown in FIG. 6 may be suitably modified depending on a temperature characteristic of working fluid used for the torque-split control system and a temperature characteristic of the fluid-pressure control system. In the shown embodiment, although only one predetermined threshold $T_1$ below the freezing point is used, two or more predetermined thresholds may be used and the second front-wheel distribution torque $Tq_2$ may be increased in a stepwise manner every predetermined thresholds in accordance with the decrease in the working-fluid temperature T detected. On the other hand, under the normal-temperature operating environment of temperatures above the predetermined threshold $T_1$, set as an initial torque of the second front-wheel distribution torque $Tq_2$ is the predetermined excessively small value $Tq_{20}$, for example ranging from 2 kgm to 4 kgm, so as to prevent the friction plates 37b from being completely spaced apart from the respective friction discs 37d with the duty ratio D/T set at 0%. Assuming that the duty ratio D/T is set at 0% and thus the second front-wheel distribution torque $Tq_2$ is set at zero under the normal-temperature operating environment, there is a remarkable response-time delay until the friction plates 37b are brought into frictional engagement with the respective friction discs 37d in case of output of the control command signal ST of such a great signal value that the engagement force of the transfer clutch is increased. In this case, if the clutch is engaged for a relatively short time period for the purpose of adjustment of the clutch engagement force from zero to the great engagement force, undesired shock may occur owing to a rapid engaging action of the clutch. To avoid undesired shock and response-time delay, the initial torque of the second front-wheel distribution torque $Tq_2$ is set at the predetermined excessively small value $Tq_{20}$ slightly greater than zero.

Thirdly, through step S11 or through step S10 the third front-wheel distribution torque $Tq_3$ is determined on the basis of the throttle opening θ read in step S3. The provision of the third front-wheel distribution torque $Tq_3$ is effective to eliminate demerits of the feedback control, which control is based on the wheel-speed difference ΔVw and in which the first front-wheel distribution torque $Tq_1$ is set at a desired value, i.e., the final target front-wheel distribution torque $Tq^*$, namely a first demerit being a greatly increased response-time delay due to the first and second mechanical phase lags as previously discussed, during the vehicle start where so-called acceleration-slip may occur at the primary drive wheels 2RL and 2RR, and a second demerit being a possibility of hunting. That is, in order to optimally compensate the feedback control based on the wheel-speed difference ΔVw, as appreciated from the flow chart of FIG. 4, the feedforward control based on the throttle opening θ is properly combined with the feedback control. To timely execute the feedforward control, steps S9 and S10 are provided. As appreciated from step S9 of FIG. 4, the feedforward control can be initiated on the assumption that the range of the front-wheel speed $V_{WF}$ (regarded as the vehicle speed) below the predetermined vehicle speed $V_{CO}$ (for example 20 km/h) corresponds to a time period that the vehicle begins to run, and that a slippage occurring at the rear wheels, the engine power, and the throttle opening θ are changed each other in a linear fashion. In step S10, the earliest data in time series, namely the detected throttle opening θ is used for calculating the third front-wheel distribution torque $Tq_3$ essentially corresponding to a desired value (i.e., the final front-wheel distribution torque $Tq^*$) of the feedforward control, so that the third front-wheel distribution torque $Tq_3$ increases in accordance with the increase in the detected throttle opening θ. Therefore, if the third front-wheel distribution torque $Tq_3$ is set at the final target front-wheel distribution torque $Tq^*$ in case of $V_{WF} \leq V_{CO}$, excessive wheel-slip (acceleration slip) which may occur at the rear wheels during the vehicle start, can be prevented before it happens or wheel-slip can be damped effectively. On the other hand, when the front-wheel speed $V_{WF}$ exceeds the predetermined vehicle speed $V_{CO}$, the third front-wheel distribution torque $Tq_3$ is set at "0" through step S11, and as a consequence the so-called start-period feedforward control is forcibly terminated. In the shown embodiment, as seen in FIG. 7, although the third front-wheel distribution torque $Tq_3$ is in direct-proportion to the throttle opening θ, the characteristic shown in FIG. 7 may be suitably modified depending on characteristics of horse-power produced by engines or on characteristics of slippage varied by tire sizes or types of tires installed on the vehicle or the like.

Fourthly, through step S14 or through step S15 the fourth front-wheel distribution torque $Tq_4$ is determined depending on a signal value of the brake signal $S_{BRK}$ read in step S5 and the front-wheel speed $V_{WF}$ read in step S1. As may be appreciated from steps S12, S13, S14 and S15, the fourth front-wheel distribution torque $Tq_4$ is set at "0", except that the brake signal value $S_{BRK}$ is a logical value "1" and additionally the front-wheel speed $V_{WF}$ regarded as a speed equivalent to the actual vehicle speed is zero. When the particular condition defined by $S_{BRK}=1$ and $V_{WF}=0$ is satisfied, the operating state of the vehicle can be regarded as a completely stopped state in which the vehicle is stopped with the brake pedal depressed. Although it is unnecessary to deliver a part of the engine power to the front wheels (the secondary drive wheels) under the above-noted particular condition, i. e., in the stopped state of the vehicle, the fourth front-wheel distribution torque $Tq_4$ is set at the predetermined value $Tq_{41}$ (for example 30 kgm) such that the fourth front-wheel distribution torque $Tq_4$ is selected instead of the third front-wheel distribution torque $Tq_3$ in case of the detected throttle opening θ less than the predetermined throttle opening θ1. For instance, during the vehicle start on low-μ roads in which so-called acceleration-slip may occur, when the detected throttle opening θ exceeds the predetermined throttle opening θ1 and the third front-wheel distribution torque $Tq_3$ gradually increases more greater than the predetermined torque $Tq_{20}$ equivalent to the predetermined throttle opening θ1, the increased third front-wheel distribution torque $Tq_3$ may be selected and thus the torque-distribution ratio of front wheels to rear wheels may be increased in accordance with the increase in the third front-wheel distribution torque $Tq_3$, thus suppressing occurrence of wheel-slip at the rear wheels or rapidly damping wheel-slip during the vehicle start. However, the detected throttle opening θ may not often reach the predetermined throttle opening Θ1 during start on excessive low-μ road or during start on steep downhill road. In this case, even when a driving torque less than the predetermined excessively small value $Tq_{20}$ is applied to the rear wheels (the primary drive wheels), acceleration-slip may often take place. During start on excessive low-μ road or during start on steep downhill road, the third front-wheel distribution torque $Tq_3$ is ineffective, because the third front-wheel distribution torque Tq3 is set at a value less than the predetermined excessively small value Tq20 (for example 2 to 4 kgm) identical to the initial torque of the second front-wheel distribution torque Tq2, owing to the detected throttle opening θ less than the predetermined throttle opening θ1 and actually there is no supply or less supply of driving torque to the front wheels. In other words, during start on excessive low-$\mu$ road or during start on steep downhill road, the feedforward control system using the third front-wheel distribution torque Tq3 as an anticipating correction value of the feedforward control does not effectively act to improve the response of the feedback control system based on the wheel-speed difference ΔVw and using the first front-wheel distribution torque Tq1 as a desired value, and thus the wheel-slip at the rear wheels cannot be attenuated effectively by the third front-wheel distribution torque Tq3. For example during start on excessive low-$\mu$ road, assuming that the feedback control based on the first front-wheel distribution torque Tq1 is performed, it takes some time to satisfactorily damp or attenuate the wheel lock and also there is an increased tendency of hunting. For the reasons set forth above, the system determines the stopped state of the vehicle by the previously-noted particular condition defined by SBRK=1 and VwF=0, and set the fourth front-wheel distribution torque Tq4 at the predetermined value Tq41 when the particular condition is satisfied. In the event that the fourth front-wheel distribution torque Tq4 set at the predetermined value Tq41 is selected as the initial value of the final target front-wheel distribution torque Tq*, the final target front-wheel distribution torque Tq* can be decreasingly adjusted from an initial value set at the predetermined value Tq41 in accordance with the previous target front-wheel distribution torque (Tq*(n−1)) versus rate-of-change (Tq') characteristic shown in FIG. 8, so that a gradient of decrease in the final target front-wheel distribution torque Tq* is properly suppressed to keep a required driving-torque distribution for the front wheels (the secondary drive wheels). As set forth above, the fourth front-wheel distribution torque Tq4 can effectively suppress acceleration-slip which may occur during start on excessive low-$\mu$ road or during start on steep downhill road, and enhance the running stability. The predetermined value Tq41 and the rate-of-change Tq' of the front-wheel distribution torque must be determined in consideration of both a first required time necessary to reach a certain small value from the initial torque (set at the predetermined value Tq41) and a second time period from the vehicle start to initiation of the feedback control (based on the wheel-speed difference ΔVw), which feedback control may be initiated rapidly or slowly depending on a gradient of decrease in the final target torque Tq* decreased from the initial torque (Tq41). In order to effectively suppress the acceleration-slip, it is preferable to determine the predetermined value Tq41 and the rate-of-change Tq' such that the previously-noted first required time is longer than the second time period.

Fifthly, the highest one of the four torques Tq1, Tq2, Tq3 and Tq4 is selected as the reference front-wheel distribution torque Tq0 (functioning as a reference value of a final target front-wheel distribution torque Tq*) by way of a so-called select-HIGH process as indicated in step S16, on the assumption that the maximum torque of the four torques is most effective to enhance the running stability.

Sixthly, by way of steps S17 through S22 the system selects one of the select-HIGH torque MAX(Tq1, Tq2, Tq3, Tq4), the predetermined maximum value Tq0MAX of the front-wheel distribution torque, and the minimum value (i.e. "0"), depending on the mode selection signals S4A, S4R and S2 from the mode-select switch 52. That is, it is most desirable to set the select-HIGH torque selected from the four torques Tq1, Tq2, Tq3 and Tq4 at the reference front-wheel distribution torque Tq0, under a particular condition in which the driver selects the AUTO mode intentionally, in expectation of an optimal four-wheel-drive state suitable for the running conditions of the vehicle and the operating conditions of the driver. Thus, only when the automatic torque-split mode is selected, i.e., only in case of S4A=1, the select-HIGH torque MAX(Tq1, Tq2, Tq3, Tq4) is set at the reference front-wheel distribution torque Tq0 through step S20. On the other hand, in the case that the driver selects the other mode (i.e., the LOCK mode or the 2WD mode) except the AUTO mode, the selected drive mode directly reflecting the driver's intention must be created necessarily. Thus, when the LOCK mode is selected, i.e., in case of S4R=1, as appreciated from the flow from step S17 to step S18, the reference front-wheel distribution torque Tq0 is changed from the select-HIGH torque MAX(Tq1, Tq2, Tq3, Tq4) (temporarily set at the reference front-wheel distribution torque Tq0 at step S16) to the predetermined maximum front-wheel distribution torque Tq0MAX at which the transfer clutch is fully engaged and thus the engine power passing from the transmission is delivered to front and rear wheels at a predetermined torque-distribution ratio (50%:50%) of front wheels to rear wheels. When the 2WD mode is selected, i.e., in case of S2=1, as appreciated from the flow from step S21 to step S22, the reference front-wheel distribution torque Tq0 is changed from the select-HIGH torque MAX(Tq1, Tq2, Tq3, Tq4) to the minimum front-wheel distribution torque "0" at which the engine power is delivered to only the rear wheels (the primary drive wheels), that is, the torque-distribution ratio is kept at 0:100%. The reference front-wheel distribution torque Tq0 obtained through steps S17 to S22 will be hereinafter referred to as a "mode-selection-signal dependent reference front-wheel distribution torque".

Seventhly, by way of steps S23, S24 and S25, the system changes a value of the reference front-wheel distribution torque Tq0 depending on the neutral position indicative signal SN. The procedure of steps S23, S24 and S25, is based on the assumption that, when the gear position is neutral and the neutral position indicative signal SN is a logical value "1", there is no transmission of the engine power to the drive wheels and thus the vehicle cannot start by no transmission of the engine power, there is less slippage at each road wheel even if the vehicle is started by gravitational acceleration imposed on the vehicle on a downhill road with the gear kept in N, and the driver has no intention of starting the vehicle. In case of SN=1, it is unnecessary to adjust or to vary the torque-distribution ratio between front and rear wheels. As may be appreciated, under such a condition, if the controlled fluid pressure Pc is adjusted, the undesired pressure adjustment may result in energy loss (fuel-economy loss). Thus, when the gear is in N (neutral), the reference front-wheel distribution torque Tq0 obtained through steps S18 or S20 is changed to zero, whereas the reference front-wheel distribution torque Tq0 obtained through step S22 remains at "0". On the other hand, in case of SN=0, as appreciated from the flow from step S23 to step S25, the mode-selection-signal dependent reference front-wheel distribution torque Tq0 remains unchanged. In case of vehicles with automatic transmissions, in place of the N (neutral) position, a P (park) position may be used to provide the same effect as explained in connection with steps S23, S24 and S25. The reference front-wheel distribution torque Tq0 obtained through steps S23 to S25 will be hereinafter referred to as a "neutralposition-indicative-signal dependent reference front-wheel distribution torque".

Figure 8:
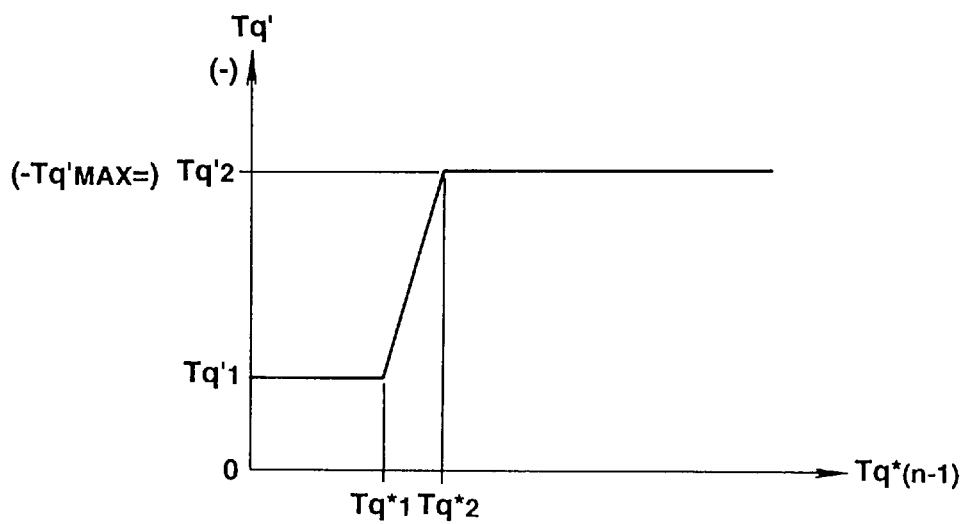
FIG. 8 is a data map illustrating the relationship between a previous value (Tq*(n–1)) of the target front-wheel distribution torque and a rate-of-change (Tq') of a front-wheel distribution torque.

Eighthly, by way of steps S26, S27 and S28, the system determines the rate-of-change Tq' of the front-wheel distribution torque on the basis of comparison of the neutral-position-indicative-signal dependent reference front-wheel distribution torque Tq0 with the previous value Tq*(n−1) of the target front-wheel distribution torque. The optimal determination of the rate-of-change Tq' is very advantageous and important so as to prevent hunting which may occur during the feedback control in which the first front-wheel distribution torque Tq1 is set at the final target front-wheel distribution torque Tq* (a desired value) and the transfer-clutch engagement force, regarded as the front-wheel distribution torque Tq, is adjusted closer to the desired value. As previously described, the response of the feedback control, called torque-split feedback control, tends to be lowered due to the first mechanical phase lag resulting from rotational moments of the front-wheel drive system, including the front propeller shaft, the front axle driveshafts and the front drive wheels and also due to the second mechanical phase lag resulting from the torque-transmission delay until the power is transmitted from the front axle driveshafts through the front tires to the road. In the event that the rate-of-change Tq' of the front-wheel distribution torque is set at a comparatively great value when the torque-split feedback control is executed, hunting may occur remarkably particularly in the presence of the previously-noted $\mu$-jump. To avoid the hunting, if the gradient of decrease of the final front-wheel distribution target torque Tq*, namely the rate-of-change Tq', is set at a comparatively small value, that is the change in the final target torque Tq* is excessively slow, there is a tendency that the final target torque Tq* cannot be satisfactorily reduced from the initial value of the front-wheel distribution torque to a desired value when the initial torque is a great value particularly during transition from a straight-ahead driving to a right-angle or left-angle turn. Just after transition to the turn, the front-wheel distribution torque tends to be maintained at a high level, and thus a comparatively great wheel-speed difference resulting from the difference in wheel travel cannot be absorbed sufficiently. In this case, a so-called tight-corner braking phenomenon may occur due to the unreasonably great torque delivery to the front wheels. To avoid both the hunting of the feedback control system and the tight-corner braking phenomenon contrary to each other, as may be appreciated from step S27 and the target front-wheel distribution torque (Tq*(n−1)) versus rate-of-change (Tq') characteristic shown in FIG. 8, the rate-of-change Tq' (the gradient of decrease of the target front-wheel distribution torque) is properly changeable depending on the magnitude of the previous front-wheel distribution torque Tq*(n−1) (essentially equivalent to an actual driving torque delivered to the front wheels) such that the rate-of-change Tq' is set at a predetermined high level when the driving-torque distribution ratio of front wheels to rear wheels is great, and such that the rate-of-change Tq' is set at a predetermined low level when the driving-torque distribution ratio of front wheels to rear wheels is small. The characteristic shown in FIG. 8 is based on the assumption that the problem of hunting of the feedback control system arises mainly during normal driving, i.e., when there is not great driving-torque delivered to the front wheels, and the tight-corner braking phenomenon and the hunting of the feedback control system both arise for a time period of decrease of the front-wheel distribution torque. For the reasons set out above, first in step S26 the reference front-wheel distribution torque Tq0 (exactly the neutral-position-indicative-signal dependent reference front-wheel distribution torque) is compared with the previous target front-wheel distribution torque Tq*(n−1) which can be regarded as a driving torque actually delivered to the front wheels in consideration of the previously-noted response-time delay, to determine whether or not, in the currently time-triggered interrupt routine, the front-wheel distribution torque is varying in a direction of decrease. When the front-wheel distribution torque is varying in a direction of increase, as appreciated from the flow from step S26 to step S28, the rate-of-change Tq' is set at the predetermined maximum rate-of-change Tq'MAX such as 120 kgm/s. In this case, since there is no problem of excessive change in the front-wheel distribution torque, it is most preferable to rapidly increase the front-wheel distribution torque for the purpose of improving the response of the torque-split control and consequently enhancing the running stability. In contrast to the above, when the front-wheel distribution torque is varying in the direction of decrease, as appreciated from the flow from step S26 to step S27, the rate-of-change Tq' is properly set in accordance with the characteristic shown in FIG. 8. As previously discussed, the characteristic of the rate-of-change Tq' is suitably determined in connection with determination of the predetermined value Tq41 for the fourth front-wheel distribution torque, in consideration of prevention of acceleration-slip which may occur during start on excessive low-$\mu$ road or during start on steep downhill road, as well as avoidance of the tight-corner braking phenomenon and the hunting of the feedback control system.

Hereinbelow described in detail is the previous target front-wheel distribution torque Tq*(n−1) versus rate-of-change (Tq') characteristic shown in FIG. 8.

In FIG. 8, the second predetermined threshold Tq*2 is preset at a predetermined maximum value of the front-wheel distribution torque which is produced by way of engagement of the transfer clutch and delivered therethrough to the front wheels during normal driving on low-$\mu$ roads (except extreme $\mu$-jump), during the vehicle start on low-$\mu$ roads, and during quick turn. On the other hand, the first predetermined threshold Tq*1 is preset at a predetermined maximum value of the front-wheel distribution torque which is produced by way of the transfer clutch and delivered therethrough to the front wheels during hard acceleration on high-$\mu$ roads and during quick turn. A first range of the previous target front-wheel distribution torque Tq*(n−1) above the second predetermined threshold Tq*2 is provided on the assumption that the rate-of-change Tq' (held at the second predetermined value Tq'2 such as −120 kgm/s) is most suitable for a front-wheel distribution torque such as being greatly increased through the start-period feedforward control for example. Within the first range, the rate-of-change Tq' is constantly held at the second predetermined value Tq'2 equal to the minimum rate-of-change (−Tq'MAX), that is the maximum gradient of decrease of the front-wheel distribution torque, and thus the front-wheel distribution torque can be rapidly reduced in the event that the accelerator pedal is released with the front-wheel distribution torque greatly increased through the above-noted start-period feedforward control. Even when a right-angle or left-angle turn follows the vehicle start on low-$\mu$ road, there is less occurrence of tight-corner braking phenomenon due to a quick change (a quick torque drop) in the front-wheel distribution torque. A second range of the previous target front-wheel distribution torque Tq*(n−1) defined by an inequality Tq*1 <Tq*(n−1)<Tq*2, is provided on the assumption that the rate-of-change Tq' is suitable for a front-wheel distribution torque which may be produced by the transfer clutch during normal driving under various road surface conditions such as on low-$\mu$ and high-$\mu$ roads (except extreme $\mu$-jump), during the vehicle start on low-$\mu$ roads, and during quick turn. As seen in FIG. 8, within the second range (Tq*1<Tq*(n−1)<Tq*2), the rate-of-change Tq' is varied linearly. Thus, in the event that the previous front-wheel distribution torque Tq*(n−1) is reduced from the second predetermined threshold Tq*2 towards the first predetermined threshold Tq*1, the rate-of-change Tq' can be rapidly varied from the second predetermined value Tq'2 (the minimum rate-of-change −Tq'MAX) towards the first predetermined value Tq'1. Within a third range defined by an inequality Tq*(n−1)≦Tq*1, the rate-of-change Tq' is held constant at the first predetermined value Tq'1 (corresponding to the minimum gradient of decrease of the front-wheel distribution torque), so that the front-wheel distribution torque can vary mildly during normal driving on dry pavements for example. The rate-of-change Tq' within the third range is effective to suppress hunting of the feedback control which may be executed for the torque-split adjustment during normal driving.

Ninthly, a filtering process for the rate-of-change Tq' of the target front-wheel distribution torque is executed through steps S29, S30 and S31. As previously described, the rate-of-change of the front-wheel distribution torque, denoted by Tq' represents a change (dTq/dt) in the front-wheel distribution torque per unit hour. As may be appreciated, it is undesirable that the actual front-wheel distribution torque (essentially equivalent to the previous target front-wheel distribution torque Tq*(n−1)) overshoots the reference front-wheel distribution torque Tq0 just after a predetermined sampling time interval ΔT for the time-triggered interrupt routine has elapsed. To more precisely determine the rate-of-change Tq' and from such a point of view that the previous value Tq*(n−1) of the target front-wheel distribution torque is used in lieu of detection of the actual front-wheel distribution torque, the system requires the filtering process for the rate-of-change Tq'. In the shown embodiment, the output quantity, which has been controlled by the torque-split control or by feeding back the value of the controlled quantity (or controlled variable), is output or interrupted at regular intervals, by way of a chopper control (or a chopping control) based on the target front-wheel distribution torque (or the desired value) calculated every sampling time intervals ΔT. Therefore, at step S29, the absolute value |Tq'·ΔT| of the product (Tq'·ΔT) of the rate-of-change Tq' of the front-wheel distribution torque and a predetermined sampling time interval ΔT, is compared with the absolute value |Tq0−Tq*(n−1)| of the difference obtained by subtracting the previous value Tq*(n−1) of the target front-wheel distribution torque from the reference front-wheel distribution torque Tq0. The absolute value |Tq'·ΔT| means a torque change which will be attained for a time period from the time when the rate-of-change Tq' has been determined through the current time-triggered interrupt routine to the time when a next time-triggered interrupt routine begins, whereas the absolute value |Tq0−Tq*(n−1)| means the deviation between the desired value (Tq0) and the current value or the actual front-wheel distribution torque (Tq*(n−1)). Thus, the condition defined by the inequality |Tq'·ΔT|≧|Tq0−Tq*(n−1)|, means that if the final target front-wheel distribution torque is based directly on the rate-of-change Tq' determined through steps S27 or S28 it may overshoot the reference front-wheel distribution torque Tq0. For the reasons set forth above, when the answer to step S29 is affirmative (YES), step S30 proceeds so as to properly compensate the rate-of-change Tq' determined through steps S27 or S28. Actually, in step S30, a new rate-of-change Tq' is calculated by subtracting the previous value Tq*(n−1) of the target front-wheel distribution torque from the reference front-wheel distribution torque Tq0 and additionally by dividing the difference (Tq0−Tq*(n−1)) by the predetermined sampling time interval ΔT, in accordance with the expression (4) that is Tq'=(Tq0−Tq*(n−1))/ΔT. In other words, the rate-of-change Tq' determined through steps S27 or S28 is decreasingly compensated only in case that the condition defined by the inequality |Tq'·ΔT|≧|Tq0−Tq*(n−1)| is satisfied. Conversely, in case of |Tq'·ΔT|<|Tq0−Tq*(n−1)|, the rate-of-change Tq' determined through steps S27 or S28 remains unchanged and thus set at a final rate of change of the front-wheel distribution torque through the flow from step S29 to step S31. Thereafter, on the basis of the final rate-of-change Tq' obtained through the filtering process of steps S29 to S31, the current value Tq*(n) of the target front-wheel distribution torque is calculated by the expression (5), that is Tq*(n)=Tq*(n−1)+Tq'·ΔT, and then the control signal ST corresponding to the calculated current target front-wheel distribution torque Tq*(n) is output to the drive circuit 59. In a broader sense, the arithmetic operation performed through steps S26, S27 and S28 and the arithmetic operation performed through steps S29, S30 and S31 are both regarded as a filtering process for the rate-of-change Tq' of the front-wheel distribution torque.

As previously described, in the case that the system decides that the front-wheel distribution torque is varying in the direction of decrease through step S26, the filtering process for the rate-of-change Tq' is initiated at step S27. Such a filtering process is herebelow described in detail in accordance with the timing charts shown in FIGS. 9A and 9B. The timing charts (simulation results) show variations of the rear-wheel speed VwR (indicated by the solid line in FIG. 9A), the front-wheel speed VwF (indicated by the broken line in FIG. 9A), and the wheel-speed difference ΔVw (indicated by the solid line in FIG. 9B), during the so-called It-jump from a constant-speed driving on high-$\mu$ road to a driving on low-$\mu$ road, on the assumption that the first front-wheel distribution torque Tq1 (computed by only the wheel-speed difference ΔVw) is reflected on the reference front-wheel distribution torque Tq0 in real time. The axis of ordinate of FIG. 9B is enlarged in comparison with the axis of ordinate of FIG. 9A, for the purpose of a better understanding of variations in the wheel-speed difference ΔVw. Although the rear wheels serving as the primary drive wheels are directly connected through the transmission to the engine and thus the wheel speeds VwR and VwF, and thus the wheel-speed difference ΔVw are actually affected by the inertia of the engine, the engine inertia is neglected in the simulation. That is, the simulation results (namely the rear-wheel speed VwR indicated by the solid line, the front-wheel speed VwF indicated by the broken line and the wheel-speed difference ΔVw) consider only a rotational inertia of the rear-wheel drive system and a rotational inertia of the front-wheel drive system. On the other hand, in case that the engine inertia as well as the inertia of the rear-wheel and front-wheel drive systems is taken into consideration, the rear-wheel speed VwR and the front-wheel speed VwF vary along the two-dotted line and the one-dotted line, respectively, whereas the wheels-speed difference ΔVw varies along the two-dotted line. Hereinbelow discussed in detail are variations of VwF, VwR and ΔVw, neglecting the engine inertia, during the torque-split control of the invention.

At the time t1, the rear wheels (the primary drive wheels) to which more of the engine power is delivered during the constant-speed driving on high-$\mu$ road, begins to slip due to the $\mu$-jump, and then the rear-wheel speed VwR begins to increase remarkably. Thus, the wheel-speed difference $\Delta$Vw begins to increase toward the predetermined positive threshold +$\Delta$Vw1 (in the direction of + sign). As a result of this, as appreciated from the characteristic of FIG. 5 (see step S7), the first front-wheel distribution torque Tq1 increases in an essentially linear fashion due to the increase in the wheel-speed difference $\Delta$Vw. The target front-wheel distribution torque Tq* which is equivalent to the reference torque Tq0 reflecting the first torque Tq1 in real time, also increases. In case that the front-wheel distribution torque is varying in a direction of increase, through the flow step S26 to step S28, the target front-wheel distribution torque Tq* increases at the maximum rate-of-change Tq'MAX. On other hand, the front-wheel speed VwF begins to increase with a predetermined response-time delay of the front-wheel drive system. Due to the rear-wheel-speed increase-rate greater than the front-wheel-speed increase-rate, the wheel-speed difference continues to increase for a while after the time t1. Thereafter, since the rear-wheel distribution torque decreases in accordance with the increase in the front-wheel distribution torque, shortly the rear-wheel speed VwR reaches a maximal value at the time t2 and almost at the same time the wheel-speed difference $\Delta$Vw reaches a maximal value, but the rear-wheel speed VwF continues to increase on and after the time t2 due to the response-time delay of the front-wheel drive system. Thus, the wheel-speed difference $\Delta$Vw begins to decrease after t2. Owing to the decrease in the wheel-speed difference $\Delta$Vw, the front-wheel distribution torque is varying in a direction of decrease, and thus the procedure flows step S26 to step S27, with the result that the rate of decrease of the reference front-wheel distribution torque Tq0 (equivalent to the wheel-speed difference $\Delta$Vw), i.e., the rate-of-change Tq' of the front-wheel distribution torque changed to the first predetermined value Tq'1 such as 15 kgm/s (corresponding to the minimum gradient of decrease of the front-wheel distribution torque) by reference to the characteristic shown in FIG. 8. Thus, the final target front-wheel distribution torque Tq* reduces mildly or moderately, and as a result the gradient of decrease of the rear-wheel speed VwR is suppressed properly to permit the rear-wheel speed VwR from decreasing moderately, thus permitting a moderate decrease in the wheel-speed difference $\Delta$Vw. Such a tendency continues until the time t3 at which the front-wheel speed VwF reaches a maximal value. After the front-wheel speed VwF reaches the maximal value at t3 due to the response-time delay of the front-wheel drive system, the front-wheel speed VwF begins to decrease due to the moderate decrease in the target front-wheel distribution torque Tq* and as a result the gradient of decrease in the wheel-speed difference $\Delta$Vw tends to become less. Additionally, an actual process deriving the final target front-wheel distribution torque Tq* from the reference front-wheel distribution torque Tq0, includes a filtering process or a limiter process such as being defined by steps S29 and S30. Thus, the gradient of decrease in the rear-wheel speed VwR becomes lesser and then the gradient of decrease in the front-wheel speed VwF affected by the response-time delay of the front-wheel drive system becomes less. In this manner, by way of the filtering process related to step S27 and the filtering or limiter process related to step S30, the final target front-wheel distribution torque Tq* can be varied mildly and thus fluctuations in the rear-wheel speed VwR can be effectively damped. By virtue of such a damping effect, the rear-wheel speed VwR changes closer to a certain wheel speed necessary to ensure or satisfy a predetermined vehicle acceleration, while producing some traction loss on the low-$\mu$ road. However, the front-wheel speed VwF cannot smoothly reach the certain wheel speed as previously owing to the response-time delay of front-wheel drive system. As a result, at time t4, the wheel-speed difference $\Delta$Vw reaches a minimal value, with the result that the final target front-wheel distribution torque Tq* begins to increase again after t4 in response to the reference front-wheel distribution torque Tq0 equivalent to the wheel-speed difference $\Delta$Vw. At this time, since the front-wheel speed difference VwF still decreases, there is less rate of increase in the target front-wheel distribution torque Tq* which is practically used for rotating the front wheels against the rotational inertia of the front-wheel drive system. Also, since the increase in the driving torque delivered to the front wheels is still insufficient, after a while the rear-wheel speed VwR also reaches to a minimal value and then shifts to a wheel-speed increasing state. Thereafter, according to the moderate increase in the target front-wheel distribution torque Tq*, the front-wheel speed VwF reaches a minimal value at the time t5 and begins to increase again from t5, and thus the rate of increase of the rear-wheel speed VwR is suppressed. Shortly, the wheel-speed difference $\Delta$Vw becomes a maximal value at the time t6, and then begins to decrease again from t6. However, in the same manner as the time period between t2 and t4, the rate of decrease in the wheel-speed difference $\Delta$Vw, i.e., the rate-of-change Tq' of the front-wheel distribution torque is suppressed, with the result that the rear-wheel speed VwR first decreases more slowly and then the gradient of increase in the front-wheel speed VwF subsequently decreases. At the time t7, the front-wheel speed VwF reaches a maximal value, and simultaneously the wheel-speed difference $\Delta$Vw is converged to a certain value necessary to satisfy a predetermined acceleration on the low-$\mu$ road, and as a result fluctuations in the target front-wheel distribution torque Tq* becomes less and thus the rear-wheel speed VwR and the front-wheel speed VwF become both shifted into their stable states.

Figure 11:
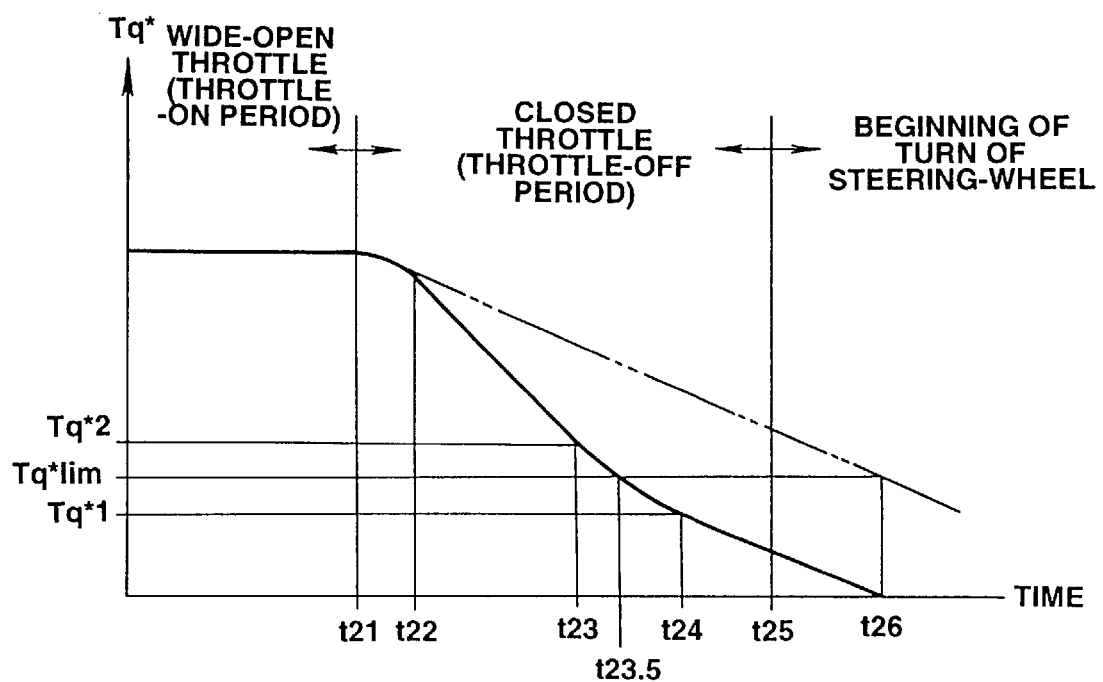
FIG. 11 is simulation results in the form of a timing chart, showing a transition state from a start of the vehicle on a low-$\mu$ road (with the accelerator pedal greatly depressed) to a turn of the vehicle (with the accelerator pedal undepressed).
Figure 12A:
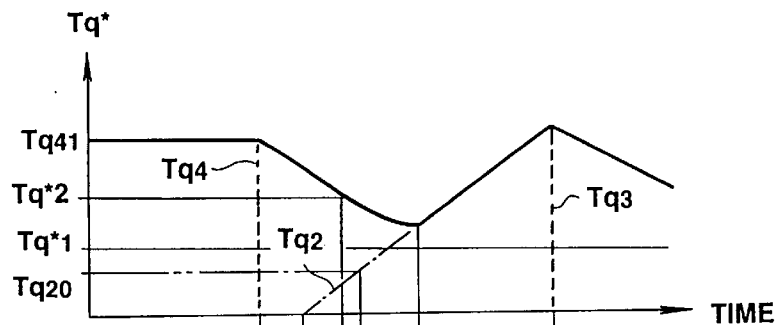
FIGS. 12A, 12B, 12C and 12D are simulation results in the form of timing charts, showing a transition state in which the brakes are applied and then the vehicle starts again on a high-$\mu$ road with the accelerator pedal depressed.
Figure 12B:
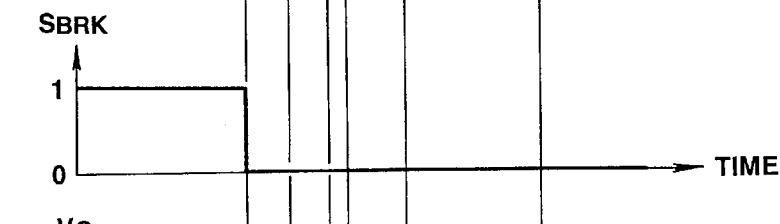
Figure 12C:
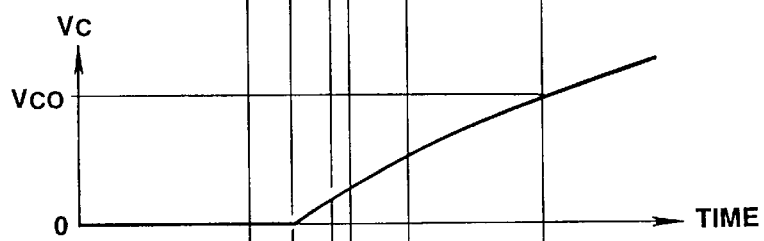
Figure 12D:
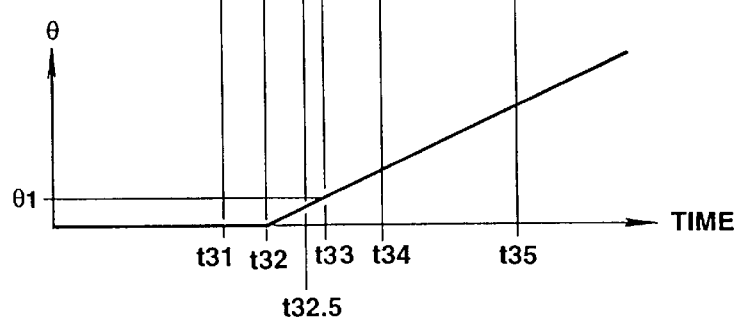

The operation of the prior art system not having the previously-noted filtering process (see steps S26 through S28) for the rate-of-change Tq' of the front-wheel distribution torque, hereinafter discussed in detail in accordance with the timing chart shown in FIGS. 10A and 10B. In the prior art system, usually a rate-of-change of a front-wheel distribution torque is held constant at a predetermined minimum rate-of-change (–Tq'MAX) even when the front-wheel distribution torque is varying in the direction of decrease, and additionally the final target front-wheel distribution torque Tq* is adjusted to a reference front-wheel distribution torque Tq0 at the predetermined minimum rate-of-change (–Tq'MAX). The condition or assumption of the simulation shown in FIGS. 10A and 10B in the form of a timing chart, is identical to that shown in FIGS. 9A and 9B. In FIGS. 10A and 10B, the vehicle behavior (variations of VwF, VwR and $\Delta$Vw) from t1 (the $\mu$-jump) to t2 when the rear-wheel speed VwR and the wheel-speed difference $\Delta$Vw are both reach their maximal values, is essentially equal to that of FIGS. 9A and 9B. In FIGS. 10A and 10B, variations of the rear-wheel speed VwR, the front-wheel speed VwF, and the wheel-speed difference $\Delta$Vw are indicated respectively by the solid line, the broken line, and the solid line. After t2, the rear-wheel speed VwR begins to decrease whereas the front-wheel speed VwF continues to increase due to the response-time delay of the front-wheel drive system, and thus the wheel-speed difference $\Delta$Vw begins to decrease. Since there is no filtering process, the rate of decrease in the reference front-wheel distribution torque Tq0, equivalent to the wheel-speed difference ΔVw, i.e., the rate-of-change Tq' is fixed at the predetermined minimum rate-of-change (−Tq'MAX). Thus, the final target front-wheel distribution torque Tq* is rapidly reduced in the same degree as the rate of decrease in the wheel-speed difference ΔVw. On the other hand, a great driving torque is delivered to the front wheels whose rotational speed continues to increase, the rear-wheel speed VwR reduces greatly and rapidly, and thus the wheel-speed difference ΔVw decreases. Such a tendency continues until the time $t_{3P}$. After the front-wheel speed VwF reaches a maximal value at $t_{3P}$ due to the response-time delay of the front-wheel drive system, the front-wheel speed VwF begins to decrease due to the rapid decrease in the target front-wheel distribution torque Tq*, but the gradient of decrease in the rear-wheel speed VwR becomes less. and as a result the gradient of decrease in the wheel-speed difference ΔVw tends to become less. Thereafter, the wheel-speed difference ΔVw becomes a minimal value at the time $t_{4P}$. After a while the rear-wheel speed VwR becomes a minimal value at the time $t_{5P}$ and begins to increase again after $t_{5P}$. However, for a while from $t_{5P}$ the front-wheel speed VwF continues to decrease greatly and rapidly due to the target front-wheel distribution torque Tq* corresponding to the reference front-wheel distribution torque Tq0 (equivalent to the wheel-speed difference ΔVw). Therefore, after $t_{5P}$, the wheel-speed difference ΔVw begins to increase rapidly and greatly. Almost simultaneously although the reference front-wheel distribution torque Tq0 and the target front-wheel distribution torque Tq* both tend to increase due to the rapid increase in the wheel-speed difference, the front-wheel speed VwF becomes a minimal value at the time $t_{6P}$ greatly later than the time $t_{5P}$ and begins again to increase after $t_{6P}$, because the rear-wheel distribution torque remains at a high level for a while after $t_{5P}$ and additionally due to the rotational inertia of the front-wheel drive system it takes some time until the force of engagement of the transfer clutch is increased. Owing to such a response-time delay, the wheel-speed difference ΔVw reaches a maximal value at the time $t_{7P}$, and the rear-wheel speed VwR reaches a maximal value at the time $t_{8P}$, whereas a maximal value of the front-wheel speed VwF takes place at the time $t_{9P}$ remarkably later than the time $t_{8P}$. Just after $t_{9P}$, a minimal value of the wheel-speed difference ΔVw takes place at the time $t_{10P}$. In the same manner as the behavior occurring after t2, the front-wheel speed VwF and the rear-wheel speed VwR cyclically increase and decrease with a phase difference. Such fluctuations in the wheel speeds VwF and VwR result in comparatively great fluctuations in the wheel-speed difference ΔVw, the reference front-wheel distribution torque Tq0, and consequently the target front-wheel distribution torque Tq*. In this case, it is difficult to converge both the front-wheel speed VwF and the rear-wheel speed VwR to certain values necessary to satisfy a predetermined vehicle acceleration on the low-μ road, and whereby it is difficult to suppress or prevent hunting of the torque-split control executed by the prior art system. To avoid the hunting resulting from the rate of torque change fixed at its maximum gradient of decrease of the front-wheel distribution torque essentially corresponding to a minimum rate-of-change (−Tq'MAX) such as −120 kgm/s, if the rate of torque change or the gradient of decrease in the front-wheel distribution torque is set at a predetermined small value, there is another problem of a so-called tight-corner braking phenomenon. This problem and the operation of the system of the embodiment are hereinafter described in detail in accordance with the timing chart shown in FIG. 11. The simulation results shown in FIG. 11 are based on the assumption that the vehicle is started on a slightly low-μ road with the accelerator pedal greatly depressed, i.e., under a wide-open throttle, the accelerator pedal is undepressed to shift from open throttle to closed throttle at the time t21 before the running state is shifted to a turn at the time t25 after a while from the vehicle start, and then the steering wheel is turned at the time t25. Variations in the target front-wheel distribution torque Tq*, which are obtained through the filtering process the system of the embodiment, are simulated as indicated by the solid line in FIG. 11, whereas variations in the target front-wheel distribution torque Tq*, which are obtained not through the filtering process, are indicated by the two-dotted line. The simulation results are also based on the assumption that the third front-wheel distribution torque Tq3 (computed by only the throttle opening θ and usable as an anticipating correction value of the so-called start-period feedforward control) is reflected on the reference front-wheel distribution torque Tq0 in real time, and the reference torque Tq0 equivalent to the third torque Tq3, i.e., the target front-wheel distribution torque Tq* is maintained at a constant torque level greater than the previously-noted second predetermined threshold Tq*2 (see FIG. 8) within the open throttle range. In FIG. 11, a torque denoted by Tq*1im represents an upper limit below which occurrence of the tight-corner braking phenomenon is avoided during the vehicle turn. In other words, on turns, the tight-corner braking phenomenon may occur at the front-wheel distribution torque Tq* above the upper limit Tq*1im.

Assuming that the rate of decrease in the target front-wheel distribution torque Tq* (i.e., the rate-of-change Tq') is limited to the above-mentioned predetermined small value, the reference front-wheel distribution torque Tq0 (equivalent to the third torque Tq3 ) tends to be quickly shifted to zero on and after the time t21 when the accelerator pedal is released at t21 and thus throttle opening is reduced down to "0". Practically, actual changes in the throttle opening θ, are not made in a stepped manner, for example owing to response characteristics of the accel-pedal wire linkage assembly. Thus, even after the rate of decrease in the reference front-wheel distribution torque Tq0 exceeds after a while from t21, the rate-of-change of the final target front-wheel distribution torque Tq* is limited to and held constant at the predetermined small value. As a result, without any filtering process as previously described, the target front-wheel distribution torque varies with a fixed gradient of decrease indicated by the two-dotted line. In this case, as may be appreciated from the right-hand steering-wheel turning region of FIG. 11, owing to the moderate change in the target front-wheel distribution torque Tq*, the target front-wheel distribution torque Tq* remains at a higher torque level than the upper limit Tq*1im within a time period between t25 and t26 until the elapsed time reaches the time t26 later than the time t25 even after the steering wheel is turned at t25. That is to say, there is an increased possibility of the tight-corner braking phenomenon during the vehicle turn after t25. In contrast to the above, in the presence of the filtering process as shown in FIG. 4, when the previous value Tq*(n−1) of the target front-wheel distribution torque (whose previous value Tq*(n−1) is regarded as an actual front-wheel distribution torque currently delivered to the front wheels) is above the second predetermined threshold Tq*2, the rate-of-change Tq' is held constant at the second predetermined value Tq'2 (equivalent to the maximum gradient of decrease). Thus, as indicated by the solid line in FIG. 11, the target front-wheel distribution torque Tq* decreases rapidly and linearly at the maximum gradient of decrease (=the minimum rate-of-change −Tq'MAX=the second predetermined value Tq'2), from the time t22 when the filtering process is initiated actually with respect to the rate-of-decrease (Tq') of the target front-wheel distribution torque Tq* to the time t23 when the target front-wheel distribution torque Tq* becomes less than the second predetermined threshold Tq*2. Thereafter, until the target front-wheel distribution torque Tq* reaches and becomes less than the first predetermined threshold Tq*1 at the time t24, owing to the linear decrease in the rate-of-change (see the torque range defined between Tq*1 and Tq*2 in FIG. 8), the target front-wheel distribution torque Tq* decreases in a quadratic curve. During a time period from t24 to t26, the target front-wheel distribution torque Tq* decreases moderately at the first predetermined value Tq'1 (the minimum gradient of decrease). In the presence of the filtering process, the target front-wheel distribution torque Tq* becomes less than the upper limit Tq*1im (a maximum permissible torque for avoidance of the tight-corner braking phenomenon) at the time t23.5 earlier than the time t25 (the starting point of the vehicle turn), and whereby there is less occurrence of the tight-corner braking phenomenon even after t25 (i.e., after the beginning of turning action of the steering wheel).

Hereinafter described in detail is a particular case that the engine inertia as well as the inertia of the rear-wheel and front-wheel drive systems is taken into consideration.

In the absence of the filtering process (for the rate-of-change Tq') shown in FIGS. 10A and 10B, owing to a comparatively great engine inertia, the rotational speed (i.e., the rear-wheel speed $V_{WR}$) of the rear wheels connected directly to the engine through the transmission, usually, not so much torque fluctuations will take place. Additionally, in case that the engine power is electronically controlled and held constant in response to the throttle opening, the fluctuations in the rear-wheel speed $V_{WR}$ may be further suppressed. Under these conditions, variations in the front-wheel speed $V_{WF}$ is indicated by the one-dotted line in FIG. 10A, variations in the rear-wheel speed $V_{WR}$ is indicated by the two-dotted line in FIG. 10A, and variations in the wheel-speed difference $\Delta V_w$ is indicated by the two-dotted line in FIG. 10B. As set froth above, since fluctuations in the rear-wheel speed $V_{WR}$ are suppressed greatly due to the great engine inertia, after the wheel-speed difference $\Delta V_w$ becomes a maximal value at t2, the front-wheel speed $V_{WF}$ tends to rapidly increase as contrasted with the rear-wheel speed $V_{WR}$ of greatly-reduced tendency of fluctuations. In real-time relationship with the rapid increase in the front-wheel speed $V_{WF}$, the wheel-speed difference $\Delta V_w$ tends to decrease and then the front-wheel speed $V_{WF}$ begins to decrease with a response-time delay resulting from the front-wheel drive system. Thereafter, essentially in synchronization with the decrease in the front-wheel speed $V_{WF}$, the wheel-speed difference $\Delta V_w$ begins to increase. Thus, the front-wheel speed $V_{WF}$ and the wheel-speed difference $\Delta V_w$ both fluctuate at a relatively short period of time. With the engine electronically controlled and held constant at a substantially constant output power, the rear-wheel speed $V_{WR}$ will decrease gradually and also the fluctuations in the wheel-speed difference $\Delta V_w$ will be damped gradually, if the front-wheel drive system is connected to and disconnected from the engine through the transfer at the previously-noted short period, on the assumption that the short period is not equivalent to a resonance frequency which may further excite the slight fluctuations in the rear-wheel speed $V_{WR}$. In this manner, the front-wheel speed $V_{WF}$ and the rear-wheel speed $V_{WR}$ may be converged to their certain wheel speeds necessary to ensure or satisfy a predetermined vehicle acceleration on the low-$\mu$ road.

Figure 9A:
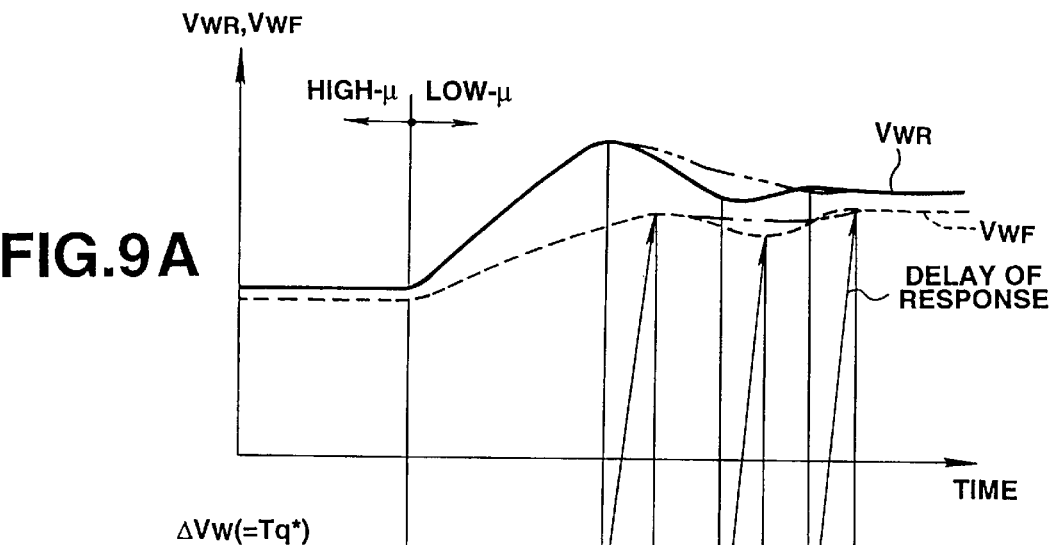
FIGS. 9A and 9B are simulation results in the form of timing charts, showing a transient traveling state from a constant-speed driving on high-$\mu$ road to a driving on low-$\mu$ road, which results are obtained through the torque-split control or the torque-distribution control executed by the system of the invention.
Figure 9B:
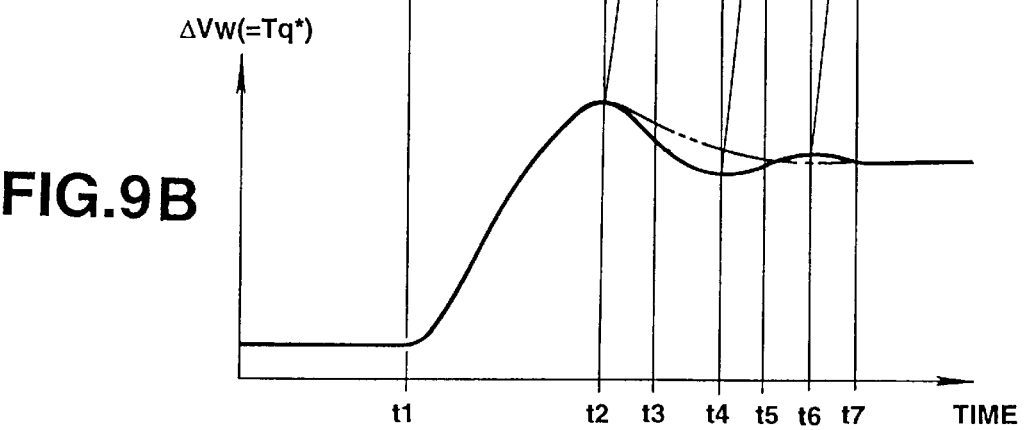

In the presence of the filtering process shown in FIGS. 9A and 9B, owing to the great engine inertia, after t2 the rate of change in the rear-wheel speed $V_{WR}$ is greatly reduced while front-wheel speed $V_{WF}$ increases moderately, with the result that the wheel-speed difference $\Delta V_w$ tends to decrease more mildly. Thus, a deceleration of the front-wheel speed $V_{WF}$ is suppressed at a less value. For such a time period, the rear-wheel speed $V_{WR}$ is decelerated slowly and varies smoothly asymptotically toward the front-wheel speed $V_{WF}$, and then the wheel-speed difference $\Delta V_w$ can be converged to a certain value necessary to satisfy a predetermined vehicle acceleration on the low-$\mu$ road, at a time earlier than the time t7, without providing any overshoot. As a consequence, the fluctuations in the target front-wheel distribution torque Tq* can be rapidly damped, and thus the rear-wheel speed $V_{WR}$ and the front-wheel speed $V_{WF}$ are shifted quickly to their stable states. As explained previously, it takes a relatively long time to damp or attenuate the fluctuations in the front-wheel speed $V_{WF}$ and the hunting resulting from the front-wheel-speed fluctuations. The filtering process of the system of the embodiment, can effectively suppress or prevent undesired fluctuations in the front-wheel speed and occurrence of hunting of the torque-split control (particularly the feedback control based on the front-and-rear wheel-speed difference $\Delta V_w$).

Hereinafter described in detail in accordance with the timing charts shown in FIGS. 12A through 12D are the operation of the torque-split control (or the driving-torque distribution control) which is executed at an earlier timing than the torque-split control shown in FIG. 11 which is executed after the vehicle start. The torque-split control shown in FIGS. 12A through 12D are initiated on and just after the vehicle start. For the purpose of a better understanding of variations in the target front-wheel distribution torque Tq*, the simulation results shown in FIGS. 12A through 12D are based on the assumption that the vehicle is stopping until the time t31 with the brake pedal depressed and then the vehicle is accelerated from a standing start with the accelerator pedal depressed at the time t32, on extremely high-$\mu$ road on which the tires have less tendency to slip or skid, and that there is no possibility of skidding or slipping at both the primary drive wheels and the secondary drive wheels and thus the first front-wheel distribution torque Tq1 (computed through step S7) remains zero owing to the wheel-speed difference $\Delta V_w$ held constant at "0" on and after the vehicle start under the normal-temperature operating environment (above the predetermined threshold T1 such as −10° C.). Variations in the target front-wheel distribution torque Tq*, variations in the brake signal $S_{BRK}$, variations in the vehicle speed Vc (equivalent to the front-wheel speed $V_{WF}$), and variations in throttle opening are respectively shown in FIGS. 12A, 12B, 12C and 12D in that order. According to the arithmetic operation shown in FIG. 4, the brake signal $S_{BRK}$ is held at the logical value "1" and also the vehicle speed Vc (=$V_{WF}$) is zero until the time t31. Through the flow from step S12 via step S13 to step S15, the fourth front-wheel distribution torque Tq4 is set at the predetermined value Tq41 (such as 30 kgm). On the other hand, the third front-wheel distribution torque Tq3 is zero due to the throttle opening θ held at zero at t31, whereas the second front-wheel distribution torque Tq2 is held at its predetermined excessively small initial torque Tq20 (such as 2 kgm to 4 kgm) less than the predetermined value Tq41. Therefore, until the time t31, the fourth torque Tq4 is set at the reference front-wheel distribution torque Tq0 through the select-HIGH process (see step S16), and also the target front-wheel distribution torque Tq*, which torque remains fixed at the reference torque $Tq_0$, does not vary without being affected by various conditions, with the result that the target front-wheel distribution torque $Tq^*$ is kept at the predetermined initial value $Tq_{41}$ of the fourth torque $Tq_4$ until the time $t_{31}$. Since the predetermined initial value $Tq_{14}$ (30 kgm) of the fourth torque $Tq_4$ is set to be greater than the second predetermined threshold $Tq^*_2$ (such as 25 kgm) and the previous value $Tq^*(n-1)$ of the target front-wheel distribution torque is equal to the reference torque $Tq_0$, the rate-of-change $Tq'$ of the front-wheel distribution torque is set at the maximum gradient of decrease (that is, the minimum rate-of-change $-Tq'_{MAX}$ such as $-120$ kgm/s) through step S27. As soon as the brakes are released at the time $t_{31}$, the brake signal $S_{BRK}$ is shifted to a logical value "0" and thus both conditions of the AND gate consisting of steps S12 and S13 are not simultaneously satisfied. As a result, just after $t_{31}$, the fourth front-wheel distribution torque $Tq_4$ is set at "0" through the flow from step S12 to S14. At this time, the select-HIGH torque MAX $\{Tq_1 (=0),$ $Tq_2 (=Tq_{20}=2$ to $4$ kgm), $Tq_3 (=0), Tq_4 (=0)\}$ is set at the predetermined initial torque $Tq_{20}$ of the second front-wheel distribution torque $Tq_2$. Thus, just after $t_{31}$, the predetermined initial torque $Tq_{20}$ of the second torque $Tq_2$ is temporarily set at the reference front-wheel distribution torque $Tq_0$ at step S16. However, since the previous value $Tq^*(n-1)$ of the front-wheel distribution torque which previous value is fixed at the predetermined initial torque $Tq_{41}$ of the fourth torque $Tq_4$ until $t_{31}$, is greater than the predetermined initial torque $Tq_{20}$ of the second torque $Tq_2$ temporarily set at the reference front-wheel distribution torque $Tq_0$, in the routine of FIG. 4, the procedure flows from step S26 to step S27. In step S27, since the previous target front-wheel distribution torque $Tq^*(n-1)$ set at the initial value $Tq_{41}$ remains greater than the second predetermined threshold $Tq^*_2$, the current value $Tq^*(n)$ of the target front-wheel distribution torque continues to be held at the maximum gradient of decrease (that is, the minimum rate-of-change $-Tq'_{MAX}$) after $t_{31}$. After a while from $t_{31}$, the target front-wheel distribution torque $Tq^*$ becomes less than the second predetermined threshold $Tq^*_2$ at the time $t_{32.5}$. For a time period defined by $t_{32.5}$ and $t_{34}$, in the same manner as the time period defined by $t_{23}$ and $t_{24}$ in FIG. 11, the target front-wheel distribution torque $Tq^*$ decreases in a quadratic curve owing to the rate-of-change $Tq'$ decreasing linearly. On the other hand, the accelerator pedal is depressed at the time $t_{32}$ prior to the time $t_{32.5}$, and thus the throttle openings $\theta$ begins to increase linearly from $t_{32}$. Under these conditions, the vehicle speed $V_C$ (equivalent to the front-wheel speed $V_{wF}$) is still maintained below the predetermined vehicle speed $V_{C0}$ such as 20 km/h, and thus the third front-wheel distribution torque $Tq_3$ is set in proportional to the throttle opening $\theta$ increasing linearly through step S10. The third torque $Tq_3$ is held below the predetermined initial torque $Tq_{20}$ of the second torque $Tq_2$ until the time $t_{33}$ when the throttle opening exceeds the predetermined throttle opening $\theta_1$. Thus, through step S16, the predetermined initial torque $Tq_{20}$ of the second torque $Tq_2$ is temporarily set at the reference front-wheel distribution torque $Tq_0$ for the time period defined between $t_{31}$ and $t_{33}$ while the third torque $Tq_3$ is temporarily set at the reference front-wheel distribution torque $Tq_0$ after $t_{33}$. For the time period defined between $t_{32}$ and $t_{33}$, the previous value $Tq^*(n-1)$ of the front-wheel distribution torque which previous value continues to decrease, is still maintained greater than the reference front-wheel distribution torque $Tq_0$ derived at each sampling time interval. The current value $Tq^*(n)$ of the final target front-wheel distribution torque which current value is derived at each sampling time interval, continues to decrease in a quadratic curve according to the rate-of-change $Tq'$ determined by the characteristic shown in FIG. 8. The vehicle speed $V_C$ continues to increase gradually from $t_{32}$ with the accelerator pedal depressed. Before the previous value $Tq^*(n-1)$ of the front-wheel distribution torque becomes less than the first predetermined threshold $Tq^*_1$, the previous value $Tq^*(n-1)$ becomes less than the reference front-wheel distribution torque $Tq_0$ (i.e., the third torque $Tq_3$ increasing according to the increase in the throttle opening $\theta$) at the time $t_{34}$. Thus, after $t_{34}$, the rate-of-change $Tq'$ is set at the predetermined maximum rate-of-change $Tq'_{MAX}$ such as $+120$ kgm/s (i.e., the maximum gradient of increase of the front-wheel distribution torque) at step S28, the current target front-wheel distribution torque $Tq^*(n)$ (equivalent to the reference front-wheel distribution torque $Tq_0$ consisting of the third torque $Tq_3$) is set and determined as a function of the predetermined maximum rate-of-change $Tq'_{MAX}$ every sampling time intervals $\Delta T$. Shortly, the vehicle speed $V_C$ (=$V_{wF}$) exceeds the predetermined vehicle speed $V_{C0}$ at the time $t_{35}$. On and after $t_{35}$ the third front-wheel distribution torque $Tq_3$ is shifted rapidly to "0" through step S11 and additionally the first front-wheel distribution torque $Tq_1$ is fixed at "0", and thus the select-HIGH torque MAX $\{Tq_1 (=0), Tq_2 (=Tq_{20}), Tq_3 (=0), Tq_4 (=0)\}$ is set again at the predetermined initial torque $Tq_{20}$ of the second front-wheel distribution torque $Tq_2$. At this time, since the third torque $Tq_3$ set at the previous value $Tq^*(n-1)$ of the front-wheel distribution torque is considerably greater than the second predetermined threshold $Tq^*_2$, the current value $Tq^*(n)$ of the final target front-wheel distribution torque continues to decrease at the maximum gradient of decrease (that is, the minimum rate-of-change $-Tq'_{MAX}$) on and after $t_{35}$ in the same manner as the time period defined by $t_{31}$ and $t_{32.5}$. In contrast to the above, the prior art torque-split control system neither serves to rise the target front-wheel distribution torque $Tq^*$ up to a predetermined level (such as the initial torque $Tq_{41}$) immediately when the brakes are applied, act to moderately it at a given rate of decrease as soon as the brakes are released, nor has the torque compensation (see steps S12 through S15) at the beginning of the vehicle start and the filtering process (see steps S26 through S28) for the rate-of-change $Tq'$. The operation of the prior art system is hereinbelow explained briefly in comparison with simulation results shown in FIGS. 12A to 12D. In case of the prior art system, the predetermined initial torque $Tq_{20}$ of the second torque $Tq_2$ may be set at the target front-wheel distribution torque $Tq^*$ until $t_{33}$, and thereafter the third torque $Tq_3$ (directly depending on the throttle opening $\theta$) may be set at the target torque $Tq^*$. As previously explained, the simulation results shown in FIGS. 12A through 12D are exemplified in case of the vehicle acceleration from a standing start on the high-$\mu$ road, for the purpose of a better understanding of the disclosure. Alternatively, in case of the vehicle start on excessive low-$\mu$ road or the vehicle start on steep downhill road (under a condition wherein the primary drive wheels are rear road wheels), it is predictable that the rear wheels (the primary drive wheels) may begin to slip owing to the throttle opening $\theta$ increasing from the time point $t_{32}$. Within the time period from $t_{32}$ to $t_{33}$, that is until the detected throttle opening $\theta$ reaches and exceeds the predetermined throttle opening $\theta_1$, the target front-wheel distribution torque $Tq^*$ is still kept at the initial torque $Tq_{20}$ at which level the engine power is not delivered to the front wheels (the secondary drive wheels). Thus, owing to slipping less-traction rear-wheels and to no torque-transmission to the front wheels, the wheel-speed difference $\Delta V_w$ may develop remarkably, and the first front-wheel distribution torque Tq1 may begin to increase due to the increase in the wheel-speed difference ΔVw. However, owing to the previously-explained response-time delay or phase-lag of the feedback control based on the wheel-speed difference ΔVw, it takes some time to satisfactorily rise a value of the distribution torque actually delivered to the front wheels and thus the wheel-slip cannot be effectively and rapidly damped. On the other hand, in case of the embodied torque-split control system having the torque compensation (see steps S12 through S15) at the beginning of the vehicle start and the filtering process (see steps S26 through S28) for the rate-of-change Tq', the target front-wheel distribution torque Tq*, which is kept at a predetermined torque level such as the initial torque Tq41 greater than the initial torque Tq20 at or before the beginning of depression of the brakes, i.e., before t31, remains within a torque range considerably higher than the initial torque Tq20 within the time period defined between t32 and t33. Owing to the residual front-wheel distribution torque considerably higher than the initial torque Tq20, the engine power, gradually increasing from t32, can be surely or certainly delivered to the front wheels (the secondary drive wheels). As set forth above, the system of the embodiment can act to suppress occurrence of acceleration-slip at the primary drive wheels or reduce the possibility of slipping during the vehicle start on excessive low-μ road or during the vehicle start on steep downhill road, or rapidly damp the wheel-slip occurring at the primary drive wheels. As may be appreciated, in case of transition from the vehicle start to the low-speed turn, there is a possibility that the previously-noted residual front-wheel distribution torque results in the so-called tight-corner braking phenomenon. In order to avoid this, in view of a particular time period necessary to shift from a time point of releasing action of the brake pedal to a time point of beginning of vehicle turn, the predetermined initial torque Tq41 of the fourth front-wheel distribution torque Tq4 and the rate-of-change Tq' (i.e., the rate of decrease) of the target front-wheel distribution torque must be determined, so that the actual front-wheel distribution torque can be properly reduced down to a value less than the previously-noted the upper limit Tq*1im (the tight-corner braking phenomenon limit torque) within the above-mentioned particular time period.

As will be appreciated from the above, the active torque-split control system of the invention can provide an optimal torque split control by effectively compensating the demerits of a feedback control based on a front-and-rear wheel-speed difference (ΔVw) and a feedforward control based on a throttle opening (θ). That is, when the vehicle is accelerated from a standing start with the brake pedal depressed, the secondary-drive-wheel distribution torque which torque is actively risen by a predetermined value (Tq41), can reduce at a predetermined rate-of-change (Tq') or a predetermined rate of decrease just after the vehicle start. Thus, for a while after the brakes are released, the residual secondary-drive-wheel distribution torque remains in the vicinity of and slightly lower than the predetermined value, and whereby the system can suppress undesired wheel-slip, called acceleration-slip, at primary drive wheels, or quickly damp the acceleration-slip. Furthermore, the system made according to the invention can effectively avoid occurrence of the tight-corner braking phenomenon on vehicle turn following after the vehicle start, and avoid wheel-slip which may occur at the primary drive wheels for example during vehicle acceleration-start on low-μ road or enhance a damping effect of the wheel-slip and consequently suppress hunting of the torque-split control, by variably adjusting or compensating the rate of change when the secondary-drive-wheel distribution torque is varying in a direction of decrease. The tight-corner braking phenomenon can be suppressed by changing the rate-of-change (Tq') of the secondary drive wheel to a greater value when the secondary-drive-wheel distribution torque is higher. On the other hand, the hunting can be prevented by changing the rate-of-change (Tq') of the secondary drive wheel to a lesser value when the secondary-drive-wheel distribution torque is lower.

As previously discussed, the system of the invention is exemplified in case of a four-wheel-drive vehicle which vehicle usually operates at a rear-drive basic mode at which power from the engine is basically delivered only to the rear drive wheels. It will be appreciated that the system may be applied to a four-wheel-drive vehicle which vehicle usually operates at a front-drive basic mode at which the engine power is basically delivered only to the front drive wheels. Also, a transfer clutch employed in the system of the invention may be comprised of an electromagnetic clutch which can continuously vary a driving-torque distribution between front and rear wheels. In the shown embodiment, a feedforward control which utilizes a throttle-opening sensitive torque (corresponding to a third front-wheel distribution torque Tq3), is initiated based on comparison of a vehicle speed with a predetermined vehicle speed (VCO), and additionally a secondary-drive-wheel speed (VwF) is used or regarded as the vehicle speed. In order to more precisely estimate the vehicle speed (VC) and to compensate fluctuations in the vehicle speed occurring due to fluctuations in driving torque delivered to secondary drive wheels, the secondary-drive-wheel speed may be properly compensated by way of a filtering process. Alternatively, a so-called pseudo vehicle speed or reference vehicle speed may be estimated by selecting the maximum wheel speed from front-left, front-right, rear-left and rear-right wheel speed data every predetermined sampling time instants, and by adding a value, which value is obtained by integration of a longitudinal acceleration exerted on the vehicle, to the maximum wheel speed. Moreover, in the embodiment, although the control unit (58) is comprised of a microcomputer, the control unit may be constructed by combining electronic circuits for example counters, comparators and the like with each other. Oil is used widely as a working fluid for the transfer clutch, fluids (air or water) other than oil may be used so as to operate the transfer clutch under fluid-pressure. In addition, if necessary, rotation of the engine crankshaft may be utilized in lieu of an electric motor (35a) so as to rotate a fluid pump (35c).

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A torque-split control system for a four-wheel-drive vehicle, comprising:

a friction clutch for variably adjusting a distribution of driving torque between a primary drive wheel of front and rear road wheels and a secondary drive wheel of said front and rear road wheels by varying a force of engagement of said friction clutch;

means for detecting a wheel-speed difference between said primary drive wheel and said secondary drive wheel;

means for detecting a vehicle speed;

means for detecting a depressed state of a brake pedal and an undepressed state of said brake pedal; and torque-split control means responsive to at least said wheel-speed difference, for determining a distribution ratio of driving torque of said secondary drive wheel to said primary drive wheel so that a driving torque to be delivered to said secondary drive wheel increases according to an increase in said wheel-speed difference, and for controlling the force of engagement of said friction clutch depending on said distribution ratio;

wherein said torque-split control means determines said distribution ratio to increase the driving torque to be delivered to said secondary drive wheel by a predetermined driving-torque value, when said brake pedal is in said depressed state and said vehicle speed is essentially equivalent to zero, and wherein said torque-split control means decreases said driving torque, which torque is increased by said predetermined driving-torque value, at a predetermined rate of change, when said brake pedal is shifted from said depressed state to said undepressed state or when said vehicle speed increases from zero.

2. A torque-split control system as set forth in claim 1, wherein said torque-split control means determines said rate of change depending on a magnitude of the driving torque to be delivered to said secondary drive wheel so that said rate of change is set at a great value when the driving torque to be delivered to said secondary drive wheel is great, and so that said rate of change is set at a less value when the driving torque to be delivered to said secondary drive wheel is less.

3. A torque-split control system for a four-wheel-drive vehicle, comprising:

a transfer clutch for variably adjusting a distribution of driving torque produced by an engine between a primary drive wheel of front and rear road wheels and a secondary drive wheel of said front and rear road wheels by varying a force of engagement of said transfer clutch;

means for detecting a wheel-speed difference between said primary drive wheel and said secondary drive wheel;

means for detecting a throttle opening of a throttle valve of said engine;

means for detecting a vehicle speed;

means for detecting a depressed state of a brake pedal and an undepressed state of said brake pedal;

feedback control means responsive to said wheel-speed difference for generating a feedback control signal, so that a driving torque to be delivered to said secondary drive wheel increases in accordance with an increase in said wheel-speed difference;

feedforward control means responsive to said throttle opening for generating an anticipating correction signal when said vehicle speed is below a predetermined threshold, so that the driving torque to be delivered to said secondary drive wheel increases in accordance with an increase in said throttle opening; and torque-split control means responsive to at least said feedback control signal and said anticipating correction signal, for determining a distribution ratio of driving torque of said secondary drive wheel to said primary drive wheel depending on the highest one of a value of said feedback control signal and a value of said anticipating correction signal, and for controlling the force of engagement of said transfer clutch depending on said distribution ratio;

wherein said torque-split control means determines said distribution ratio to rise the driving torque to be delivered to said secondary drive wheel up to a predetermined driving-torque value regardless of said feedback control signal and said anticipating correction signal, when said brake pedal is in said depressed state and said vehicle speed is essentially equivalent to zero, and wherein said torque-split control means decreases said driving torque, which torque is risen to said predetermined driving-torque value, at a predetermined rate of change, when said brake pedal is shifted from said depressed state to said undepressed state or when said vehicle speed increases from zero.

4. A torque-split control system as set forth in claim 3, wherein said torque-split control means comprises filtering means for determining said rate of change depending on a magnitude of the driving torque to be delivered to said secondary drive wheel so that said rate of change is set at a second predetermined value when the driving torque to be delivered to said secondary drive wheel is greater than a second predetermined threshold, and so that said rate of change is set at a first predetermined value less than said second predetermined value when the driving torque to be delivered to said secondary drive wheel is less than a first predetermined threshold less than said second predetermined threshold, and so that said rate of change is linearly changed from said first predetermined value to said second predetermined value when the driving torque to be delivered to said secondary drive wheel is changed from said first predetermined threshold to said second predetermined threshold.

5. A torque-split control system for a four-wheel-drive vehicle, comprising:

a transfer clutch for variably adjusting a distribution of driving torque produced by an engine between a primary drive wheel of front and rear road wheels and a secondary drive wheel of said front and rear road wheels by varying a force of engagement of said transfer clutch;

means for detecting a wheel-speed difference between said primary drive wheel and said secondary drive wheel;

means for detecting a throttle opening of a throttle valve of said engine;

means for detecting a vehicle speed;

feedback control means responsive to said wheel-speed difference for generating a feedback control signal, so that a driving torque to be delivered to said secondary drive wheel increases in accordance with an increase in said wheel-speed difference;

feedforward control means responsive to said throttle opening for generating an anticipating correction signal when said vehicle speed is below a predetermined threshold, so that the driving torque to be delivered to said secondary drive wheel increases in accordance with an increase in said throttle opening;

torque-split control means responsive to at least said feedback control signal and said anticipating correction signal, for determining a distribution ratio of driving torque of said secondary drive wheel to said primary drive wheel depending on the highest one of a value of said feedback control signal and a value of said anticipating correction signal, and for controlling the force of engagement of said transfer clutch depending on said distribution ratio; and said torque-split control means including filtering means for variably adjusting a rate of change of the driving torque to be delivered to said secondary drive wheel depending on a magnitude of the driving torque to be delivered to said secondary drive wheel only when a driving torque delivered to said secondary drive wheel is varying in a direction of decrease.

6. A torque-split control system as set forth in claim 5, wherein said filtering means sets said rate of change at a predetermined maximum rate-of-change when the driving torque delivered to said secondary drive wheel is varying in a direction of increase.

7. A torque-split control system as set forth in claim 5, wherein said filtering means determines said rate of change, so that said rate of change is set at a second predetermined value when the driving torque to be delivered to said secondary drive wheel is greater than a second predetermined threshold, and so that said rate of change is set at a first predetermined value less than said second predetermined value when the driving torque to be delivered to said secondary drive wheel is less than a first predetermined threshold less than said second predetermined threshold, and so that said rate of change is linearly changed from said first predetermined value to said second predetermined value when the driving torque to be delivered to said secondary drive wheel is changed from said first predetermined threshold to said second predetermined threshold.

8. A torque-split control system for a four-wheel-drive vehicle, comprising:

a fluid-pressure operated transfer clutch for variably adjusting a distribution of driving torque produced by an engine between a primary drive wheel of front and rear road wheels and a secondary drive wheel of said front and rear road wheels by varying a force of engagement of said transfer clutch;

means for detecting a wheel-speed difference between said primary drive wheel and said secondary drive wheel;

means for detecting a temperature of working fluid used to vary the force of engagement of said transfer clutch;

means for detecting a throttle opening of a throttle valve of said engine;

means for detecting a vehicle speed;

means for detecting a depressed state of a brake pedal and an undepressed state of said brake pedal;

feedback control means responsive to said wheel-speed difference for generating a feedback control signal, so that a driving torque to be delivered to said secondary drive wheel increases in accordance with an increase in said wheel-speed difference;

compensation means for generating a temperature-dependent compensated torque indicative signal depending on said temperature of working fluid;

feedforward control means responsive to said throttle opening for generating an anticipating correction signal when said vehicle speed is below a predetermined threshold, so that the driving torque to be delivered to said secondary drive wheel increases in accordance with an increase in said throttle opening; and torque-split control means responsive to said feedback control signal, said anticipating correction signal and said temperature-dependent compensated torque indicative signal, for determining a distribution ratio of driving torque of said secondary drive wheel to said primary drive wheel depending on the highest one of a value of said feedback control signal, a value of said anticipating correction signal and a value of said temperature-dependent compensated torque indicative signal, and for controlling the force of engagement of said transfer clutch depending on said distribution ratio;

wherein said torque-split control means determines said distribution ratio to rise the driving torque to be delivered to said secondary drive wheel up to a predetermined driving-torque value regardless of said feedback control signal, said anticipating correction signal and said temperature-dependent compensated torque indicative signal, when said brake pedal is in said depressed state and said vehicle speed is essentially equivalent to zero, and wherein said torque-split control means decreases said driving torque, which torque is risen to said predetermined driving-torque value, at a predetermined rate of change, when said brake pedal is shifted from said depressed state to said undepressed state or when said vehicle speed increases from zero.

9. A torque-split control system as set forth in claim 8, wherein said torque-split control means comprises filtering means for determining said rate of change depending on a magnitude of the driving torque to be delivered to said secondary drive wheel so that said rate of change is set at a second predetermined value when the driving torque to be delivered to said secondary drive wheel is greater than a second predetermined threshold, and so that said rate of change is set at a first predetermined value less than said second predetermined value when the driving torque to be delivered to said secondary drive wheel is less than a first predetermined threshold less than said second predetermined threshold, and so that said rate of change is linearly changed from said first predetermined value to said second predetermined value when the driving torque to be delivered to said secondary drive wheel is changed from said first predetermined threshold to said second predetermined threshold.

10. A torque-split control system as set forth in claim 9, wherein said predetermined driving-torque value is preset to be greater than said second predetermined threshold.

11. A torque-split control system as set forth in claim 9, wherein said compensation means generates a predetermined first temperature-dependent compensated torque indicative signal when said temperature is within a normal-temperature operating region and generates a predetermined second temperature-dependent compensated torque indicative signal when said temperature is within a low-temperature operating region, and wherein a value of said predetermined first temperature-dependent compensated torque indicative signal is preset to be less than said first predetermined threshold.

* * * * *